United States Patent
Nishi et al.

(10) Patent No.: US 9,952,657 B2
(45) Date of Patent: Apr. 24, 2018

(54) DISPLAY APPARATUS AND DISPLAY CONTROL METHOD

(71) Applicant: SONY CORPORATION, Tokyo (JP)

(72) Inventors: Tomohiro Nishi, Kanagawa (JP);
Kazuki Yokoyama, Kanagawa (JP);
Masuyoshi Kurokawa, Kanagawa (JP);
Kohei Miyamoto, Kanagawa (JP);
Takeshi Uemori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 316 days.

(21) Appl. No.: 14/368,545

(22) PCT Filed: Mar. 25, 2013

(86) PCT No.: PCT/JP2013/002027
§ 371 (c)(1),
(2) Date: Jun. 25, 2014

(87) PCT Pub. No.: WO2013/145706
PCT Pub. Date: Oct. 3, 2013

(65) Prior Publication Data
US 2014/0347267 A1    Nov. 27, 2014

(30) Foreign Application Priority Data
Mar. 28, 2012    (JP) .................... 2012-072669

(51) Int. Cl.
*G06F 3/00* (2006.01)
*G06F 3/147* (2006.01)
(Continued)

(52) U.S. Cl.
CPC ............ *G06F 3/005* (2013.01); *G06F 1/1643* (2013.01); *G06F 3/011* (2013.01); *G06F 3/013* (2013.01);
(Continued)

(58) Field of Classification Search
CPC ........... G09G 2354/00; G09G 2340/14; G09G 2340/12; G09G 5/026; G09G 2358/00;
(Continued)

(56) References Cited

U.S. PATENT DOCUMENTS

| 5,526,812 A | 6/1996 | Dumoulin et al. |
| 2006/0125844 A1* | 6/2006 | Hasegawa ............... G09G 5/14 345/619 |

(Continued)

FOREIGN PATENT DOCUMENTS

| CN | 101854472 A | 10/2010 |
| EP | 2 216 678 A1 | 8/2010 |

(Continued)

OTHER PUBLICATIONS

International Search Report dated Jul. 25, 2013 in PCT/JP2013/002027.
(Continued)

*Primary Examiner* — Abhishek Sarma
(74) *Attorney, Agent, or Firm* — Chip Law Group

(57) ABSTRACT

An apparatus includes a display controller configured to control a display state of a transparent display based on a sensor output that contains information regarding an object separated from the apparatus.

20 Claims, 24 Drawing Sheets

(51) Int. Cl.
   *G06F 3/01* (2006.01)
   *G06F 1/16* (2006.01)
   *G09G 5/02* (2006.01)
(52) U.S. Cl.
   CPC ............ *G06F 3/147* (2013.01); *G09G 5/026* (2013.01); *G09G 2300/023* (2013.01); *G09G 2340/12* (2013.01); *G09G 2340/14* (2013.01); *G09G 2354/00* (2013.01); *G09G 2358/00* (2013.01)
(58) Field of Classification Search
   CPC . G09G 2300/023; G06F 1/1643; G06F 3/013; G06F 3/011; G06F 3/005; G06F 3/147
   See application file for complete search history.

(56) References Cited

U.S. PATENT DOCUMENTS

| | | | |
|---|---|---|---|
| 2010/0194880 A1 | 8/2010 | Furutani et al. | |
| 2010/0277439 A1 | 11/2010 | Charlier et al. | |
| 2012/0102438 A1* | 4/2012 | Robinson | G06F 3/011 715/863 |
| 2012/0105487 A1* | 5/2012 | Son | G06F 3/0487 345/671 |
| 2012/0256854 A1* | 10/2012 | Lee | G06F 1/1643 345/173 |
| 2012/0277439 A1 | 11/2012 | Tanaka | |

FOREIGN PATENT DOCUMENTS

| | | | |
|---|---|---|---|
| JP | 07-136175 | A | 5/1995 |
| JP | 08-280710 | A | 10/1996 |
| JP | 2005-208125 | A | 8/2005 |
| JP | 2008-083289 | A | 4/2008 |
| JP | 2009-051253 | A | 3/2009 |
| JP | 2010-108647 | A | 5/2010 |
| JP | 2010-183378 | A | 8/2010 |
| JP | 2010-541054 | A | 12/2010 |
| JP | 2011-059589 | A | 3/2011 |
| JP | 2011-076560 | A | 4/2011 |
| JP | 2012-048571 | A | 3/2012 |
| JP | 2013-041100 | A | 2/2013 |

OTHER PUBLICATIONS

Ya Zhou, et al., "A novel optical see-through head-mounted display with occlusion and intensity matching support", Technologies for E-learning and Digital Entertainment, Lecture Notes in Computer Science, LNCS, XP019061723, Jun. 2007, pp. 56-62.
Kohei Tanaka, et al., "An information layout method for an optical see-through head mounted display focusing on the viewability", IEEE International Symposium on Mixed and Augmented Reality, XP031343989, Sep. 2008, pp. 139-142.
Ronald Azuma, et al., "Recent advances in augmented reality", IEEE Computer Graphics and Applications, XP011093930, Nov./Dec. 2001, pp. 34-47.
Kosuke Takeda, et al., "Diminished reality for landscape video sequences with homographies", Knowledge-based and Intelligent Information and Engineering Systems, XP019149927, Sep. 2010, pp. 501-508.
Daniel Wigdor, et al., "LucidTouch: A see-through mobile device", Proceedings of the 20$^{th}$ Annual ACM Symposium on User Interface Software and Technology, XP002582051, Oct. 2007, pp. 269-278.
Japanese Office Action dated Aug. 11, 2015 in patent application No. 2012072669.
Office Action received for Japanese Patent Application No. Apr. 5, 2016, 6 pages of Office Action.
Office Action received for Chinese Patent Application No. 201380015137.8, dated Jun. 24, 2016, 22 pages of office action including 13 pages of English translation.
Kosuke Takeda et al., "Diminished Reality for Landscape Video Sequences with Homographies", KES 2010, Springer-Verlag Berlin Heidelberg, Part III, LNAI 6278, pp. 501-508, 2010.
Office Action of JP Patent Application No. 2012-072669, dated Sep. 28, 2016, 2 pages.
Office Action for JP Patent Application No. 2016-126055, dated Apr. 25, 2017, 5 pages and 3 pages of translation.
Mori, et al., "Framework and Technical Issues of Diminished Reality : A Survey of Technologies That Can Visually Diminish the Objects in the Real World by Superimposing, Replacing, and Seeing-Through", Transactions of the Virtual Reality Society of Japan, vol. 16, Issue 2, 2011, pp. 239-250.
Office Action for JP Patent Application No. 2016-126055, dated Dec. 5, 2017, 04 pages of Office Action and 04 pages of English Translation.

* cited by examiner

[Fig. 1]
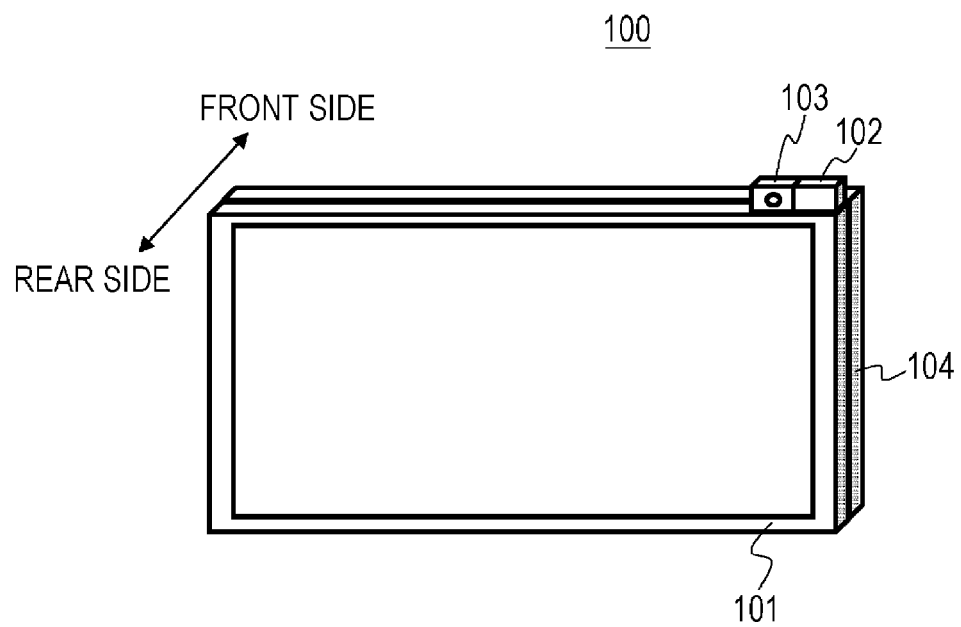

[Fig. 2]
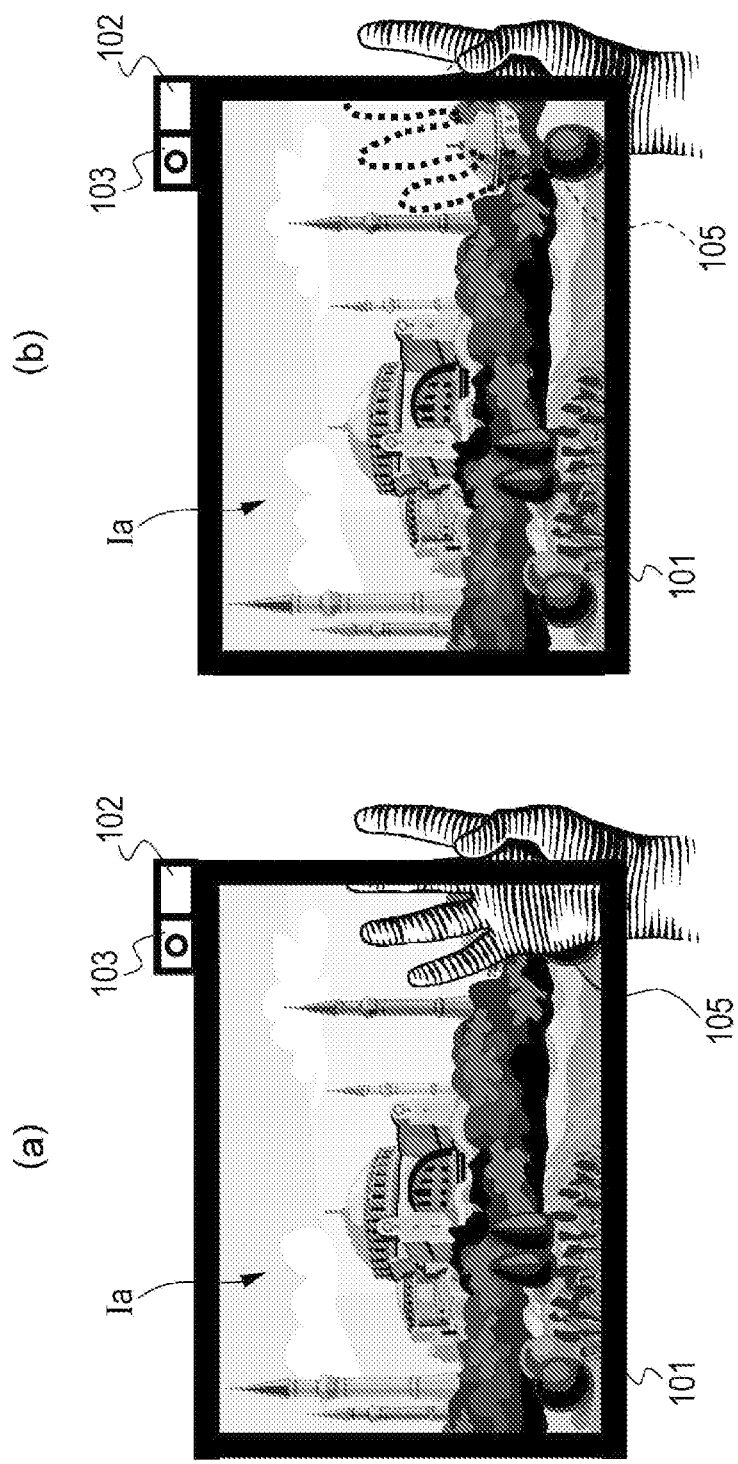

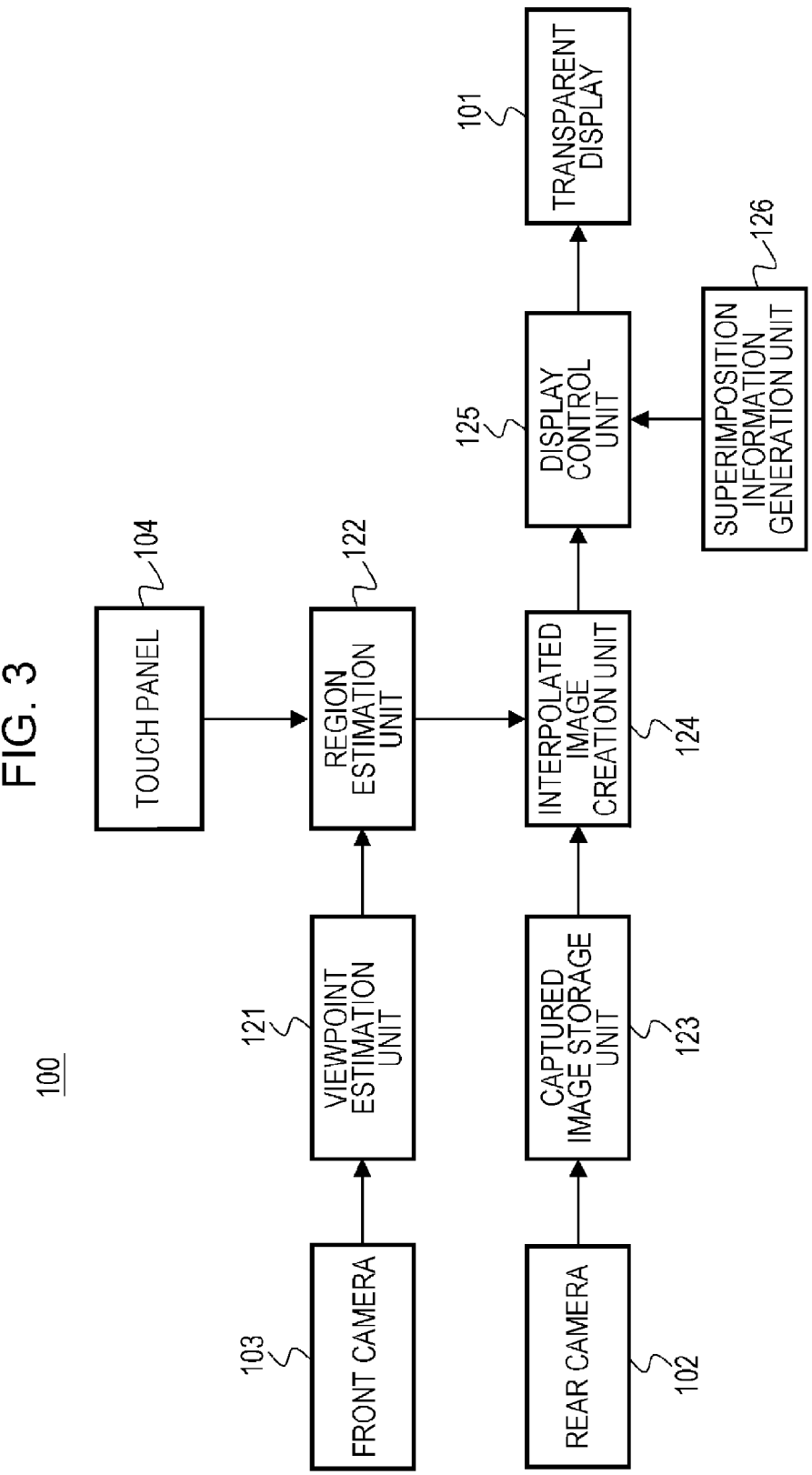
[Fig. 3]

[Fig. 4]
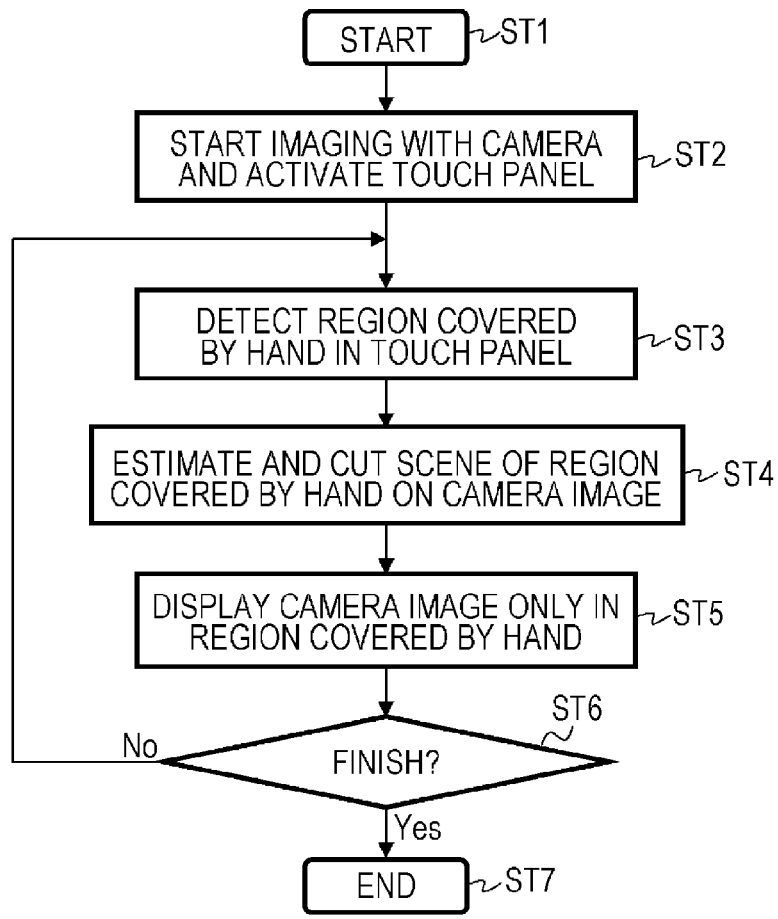
[Fig. 5]
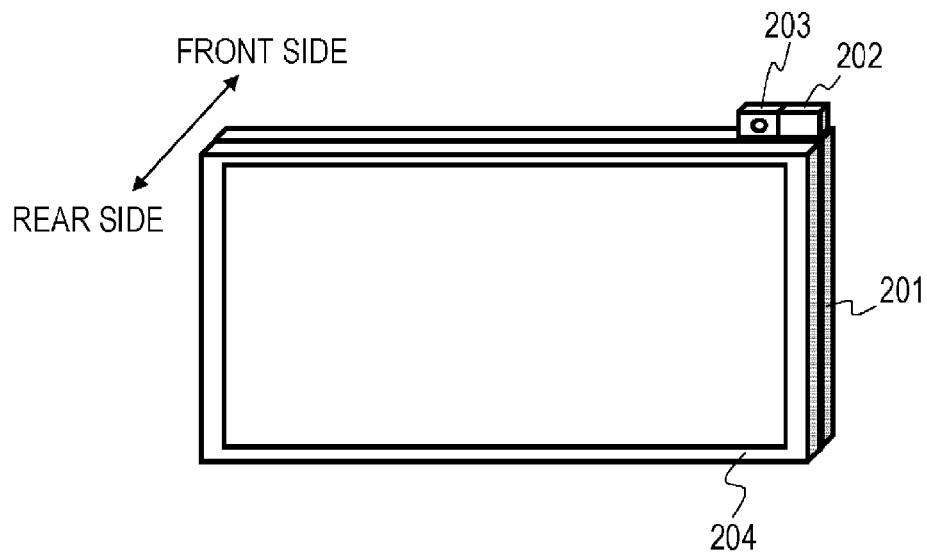

[Fig. 6]
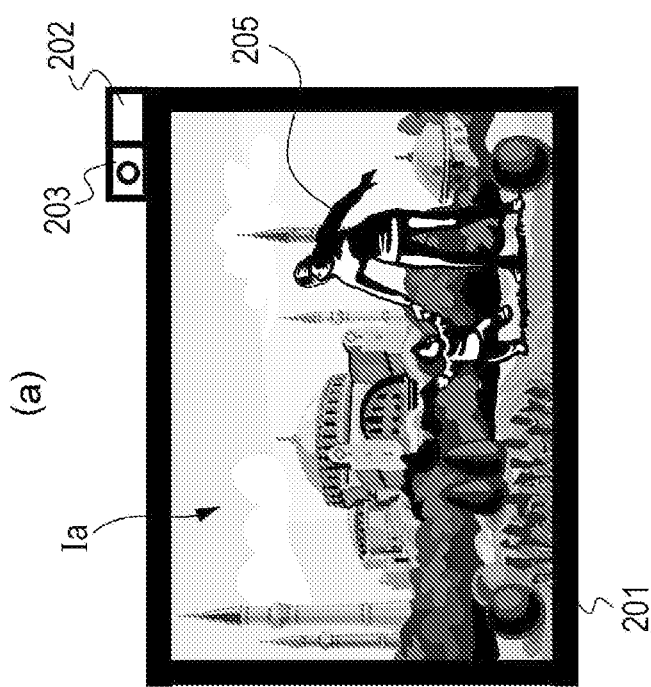
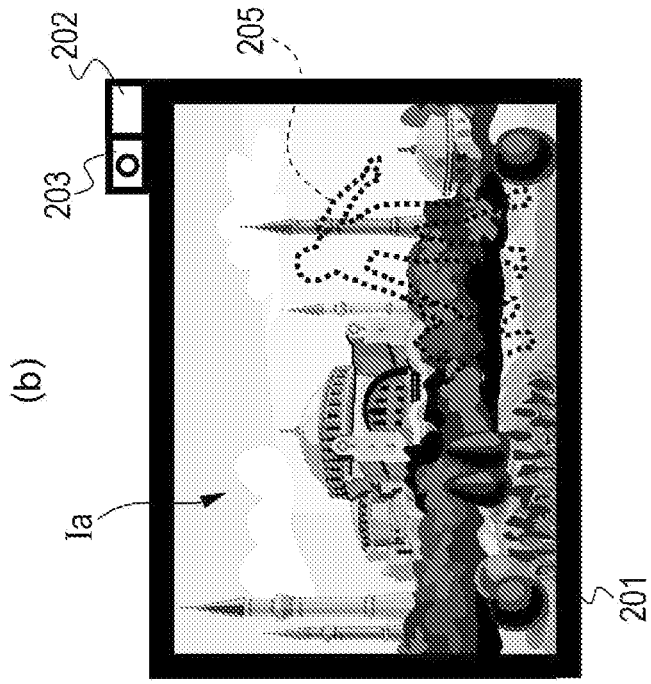

[Fig. 7]
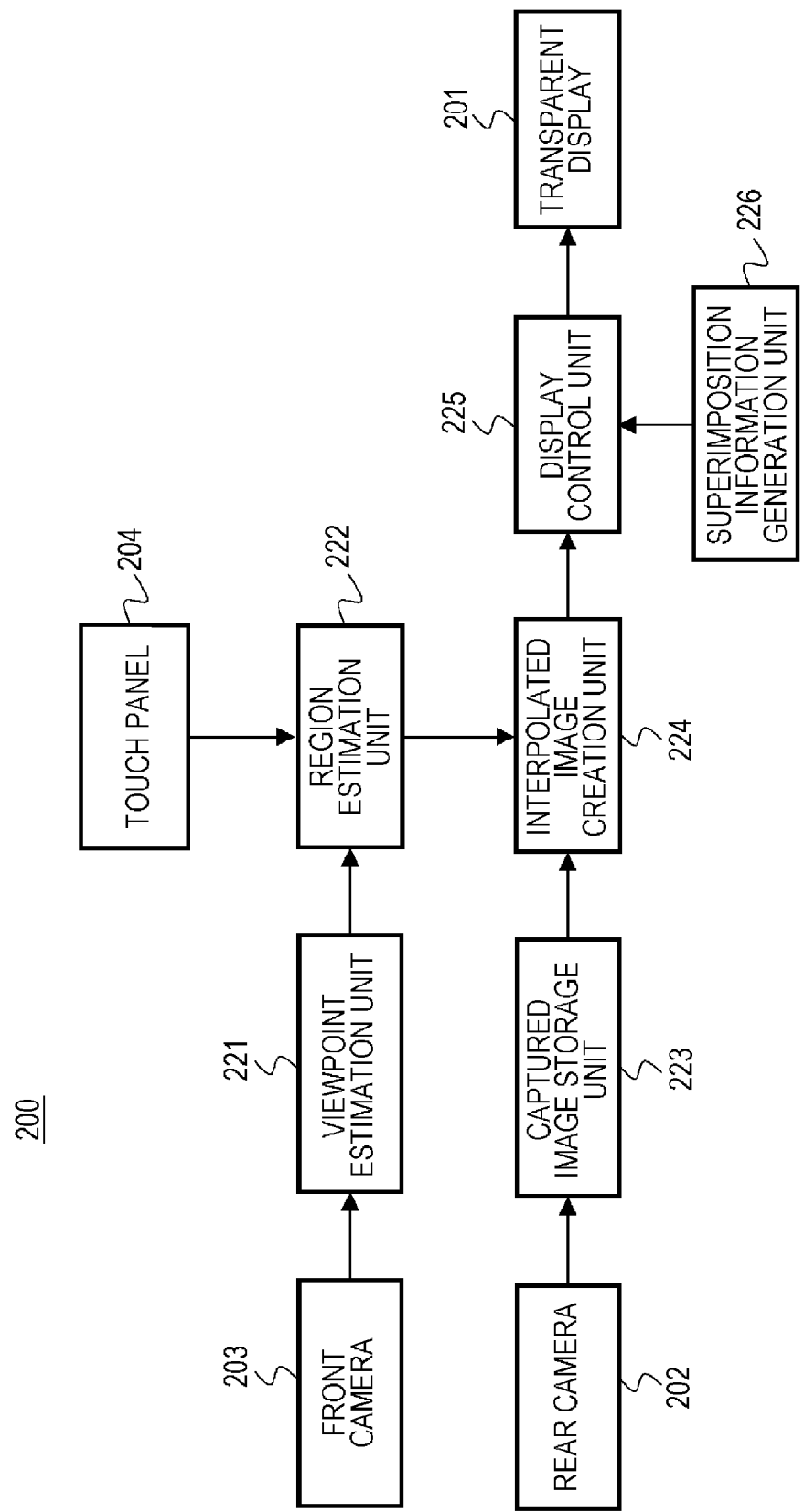

[Fig. 8]
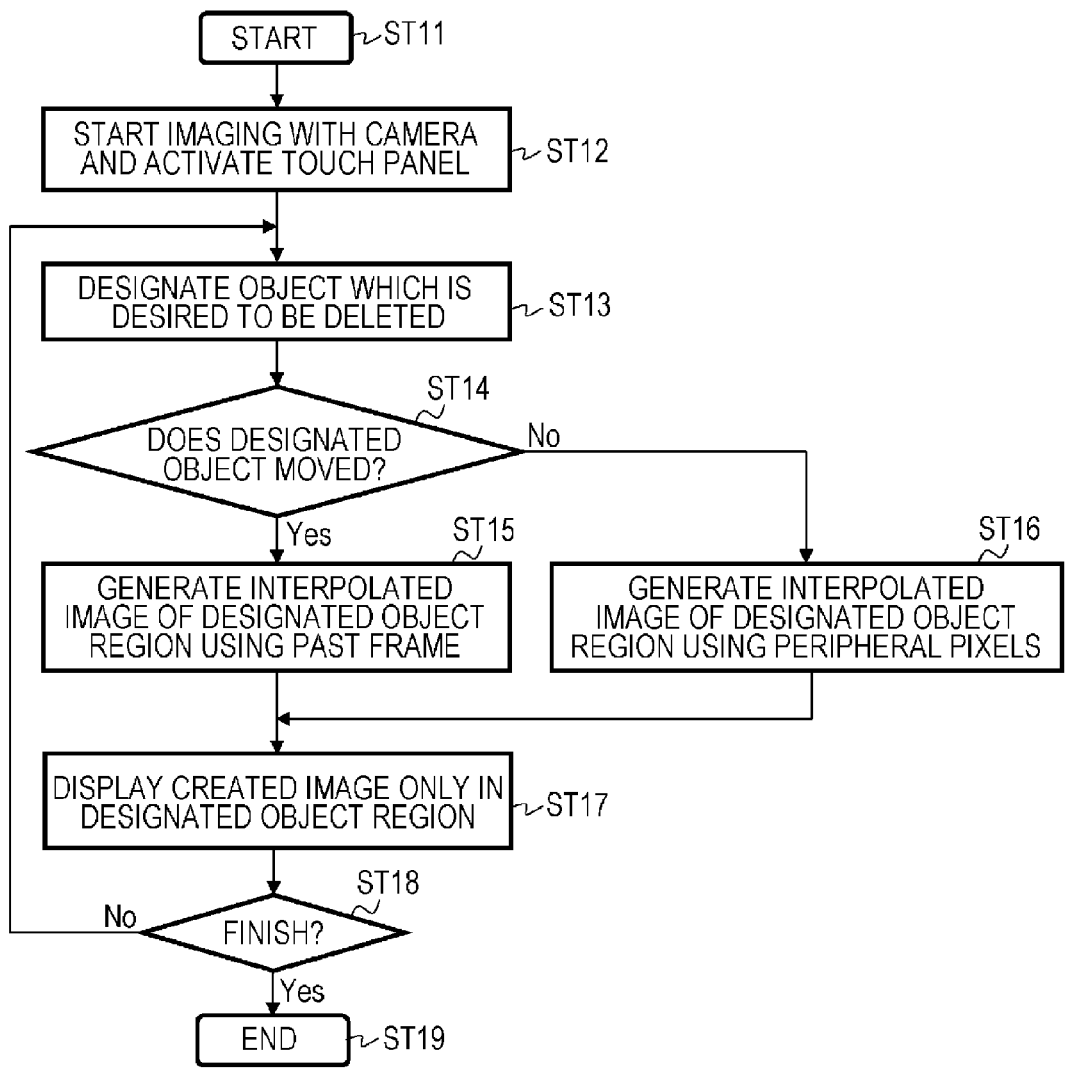

[Fig. 9]
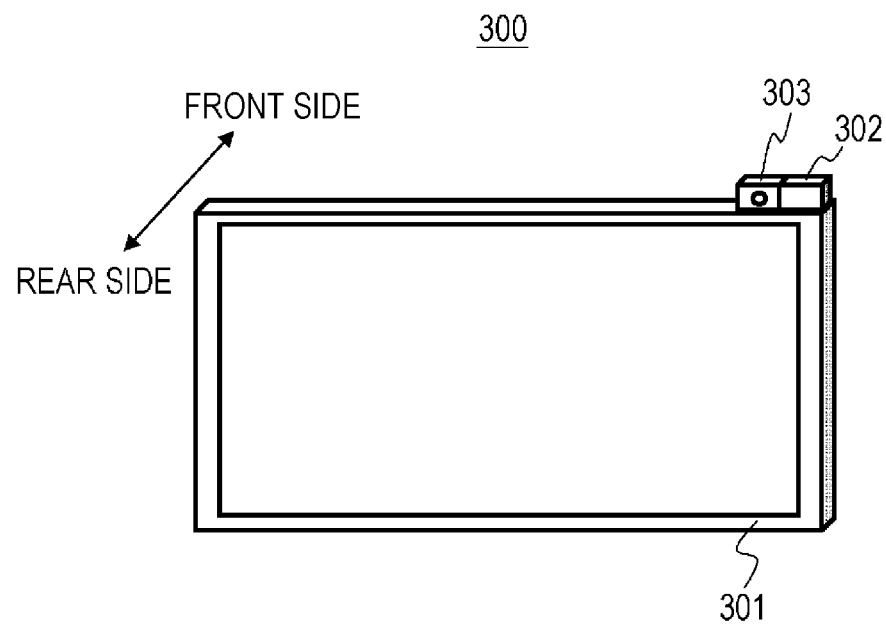

[Fig. 10]
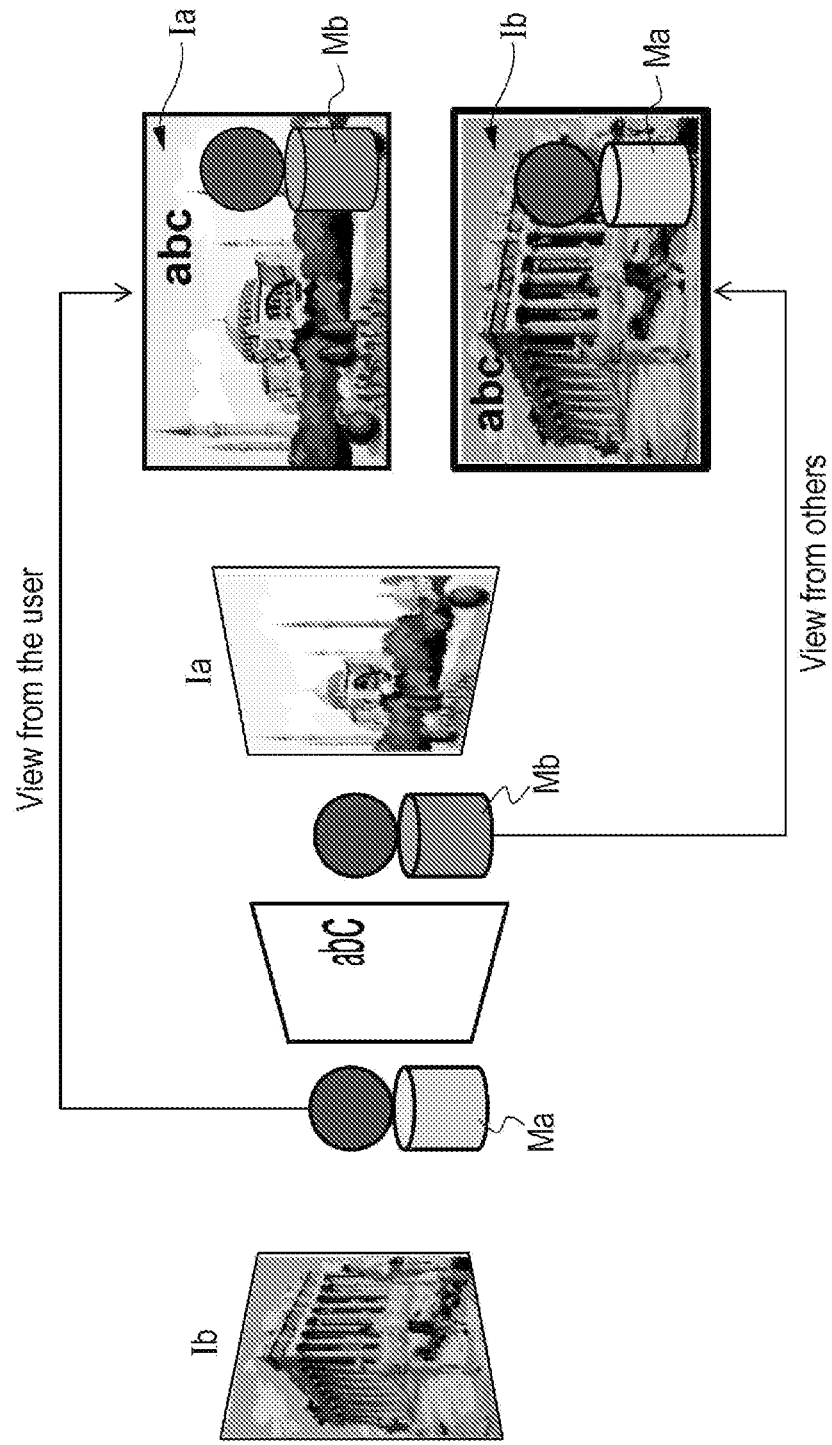

[Fig. 11]
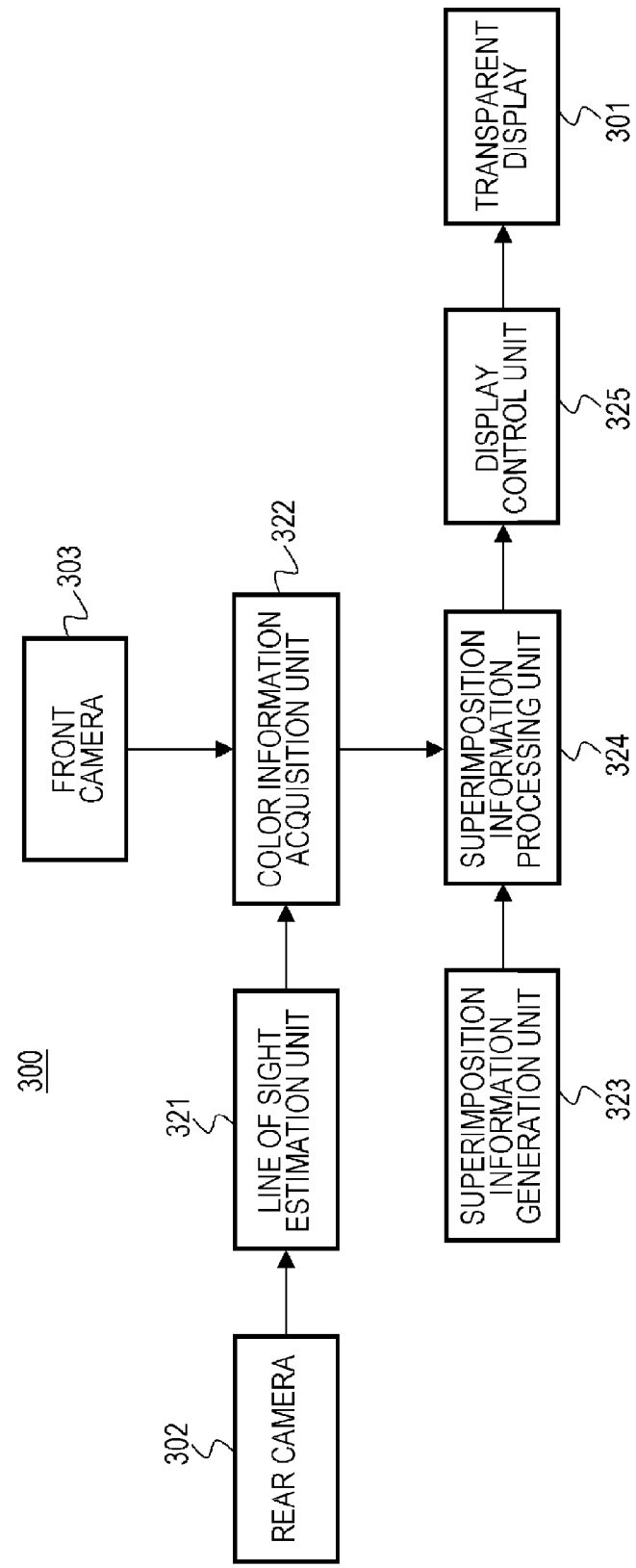

[Fig. 12]
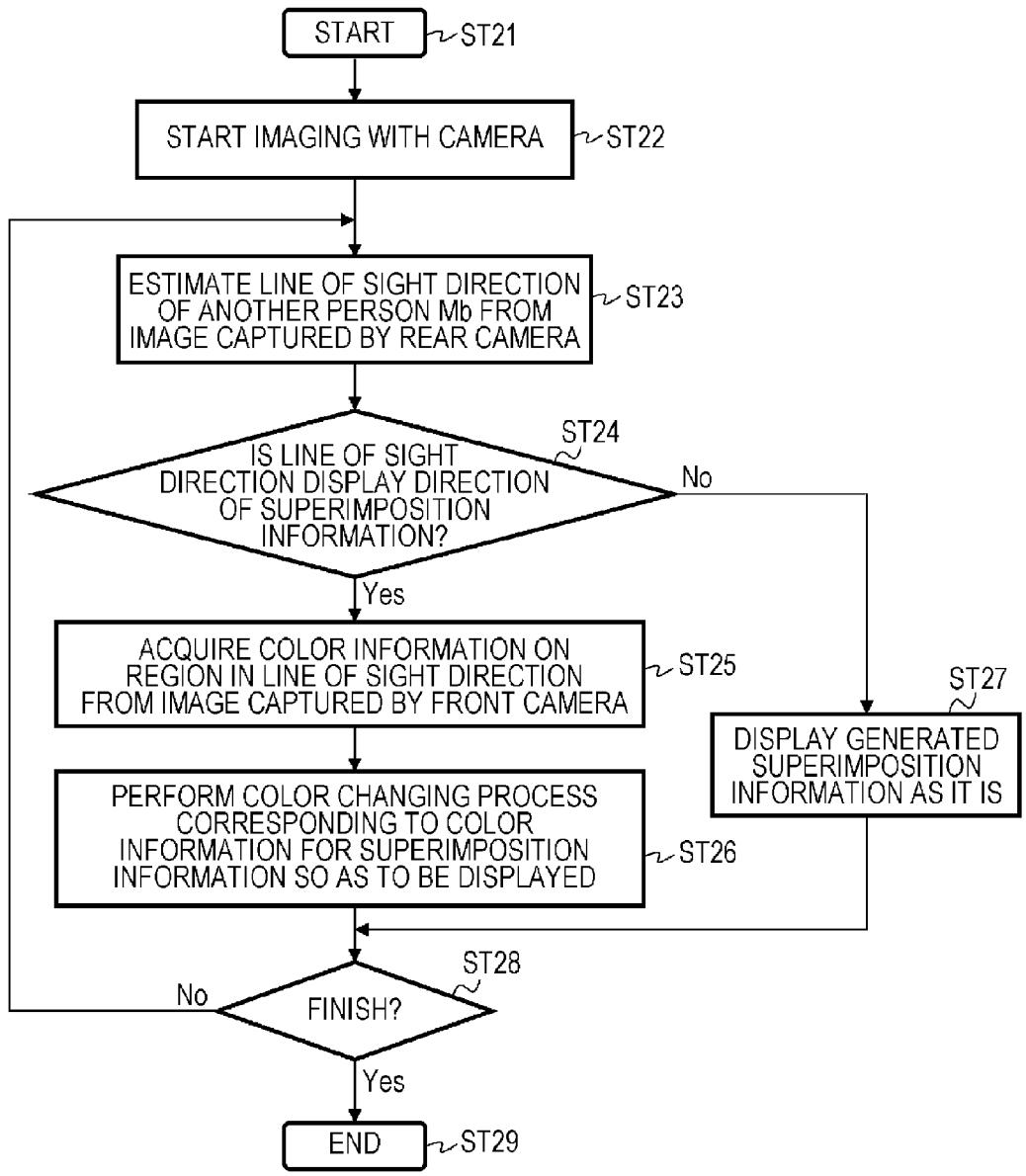

[Fig. 13]
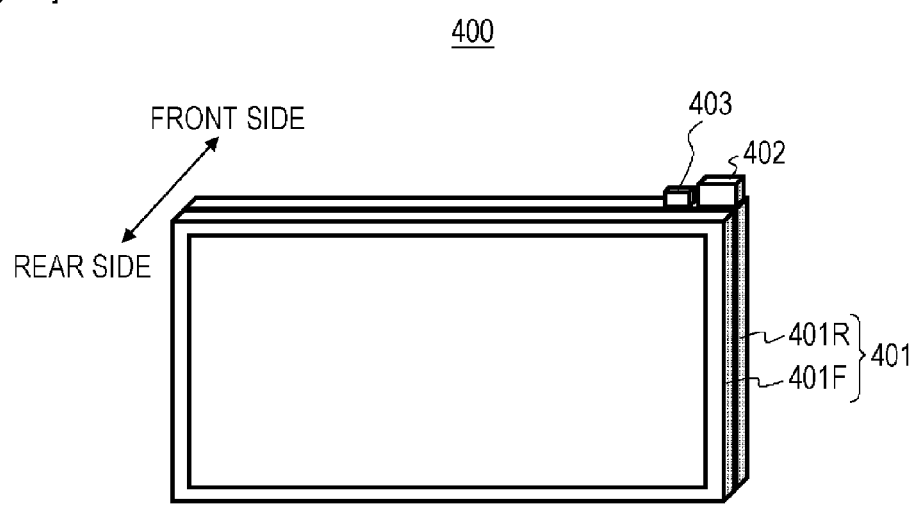

[Fig. 14]
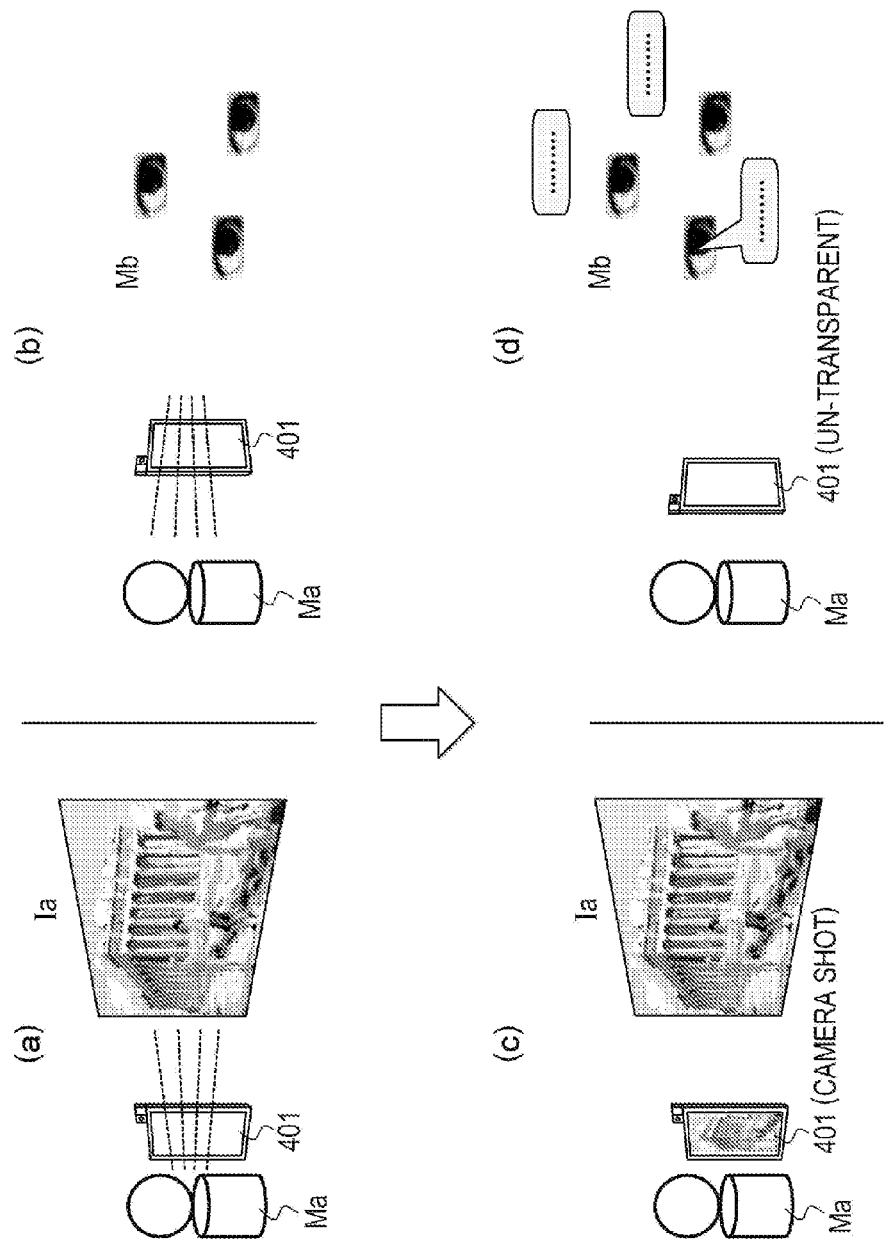

[Fig. 15]
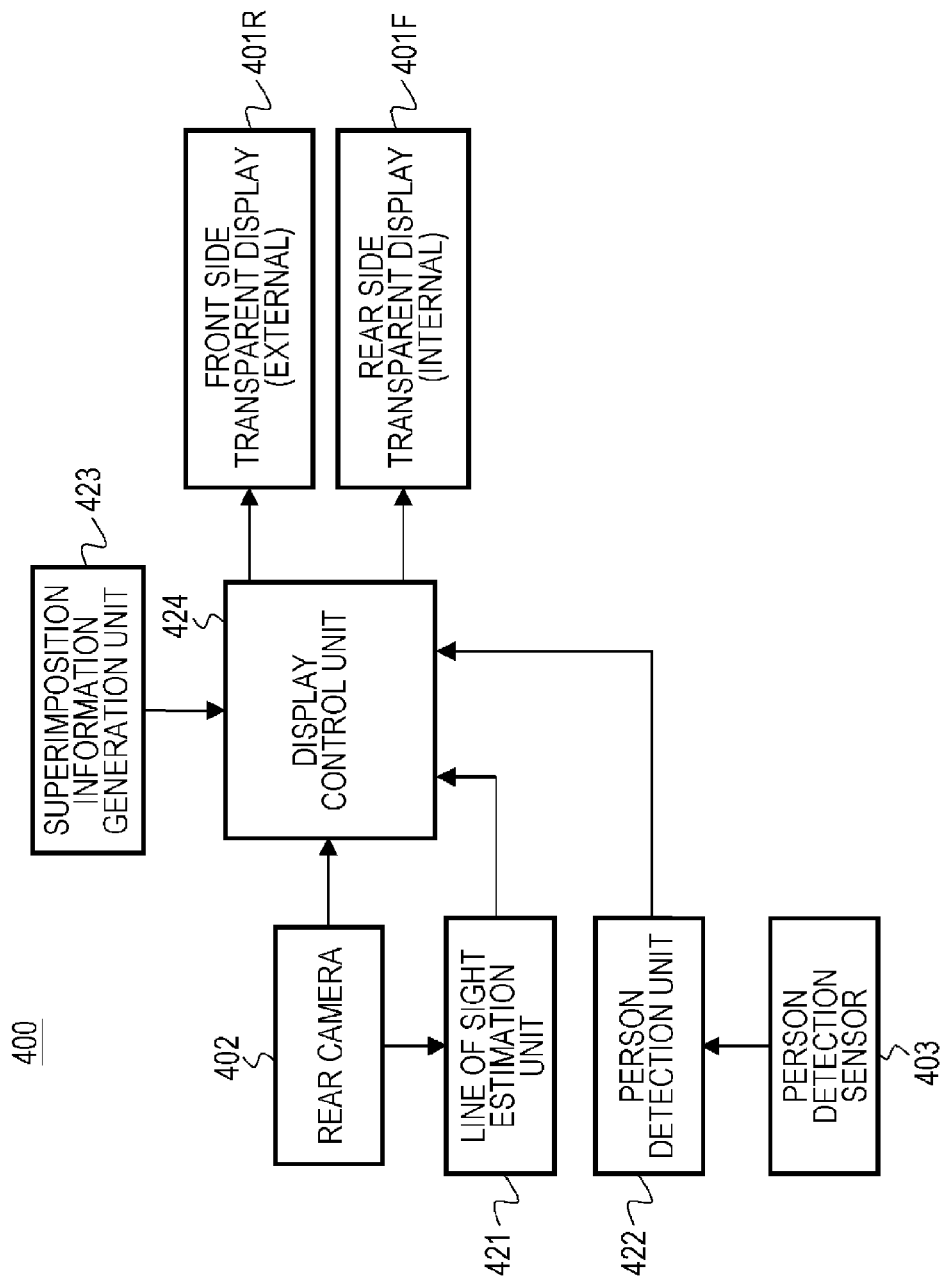

[Fig. 16]
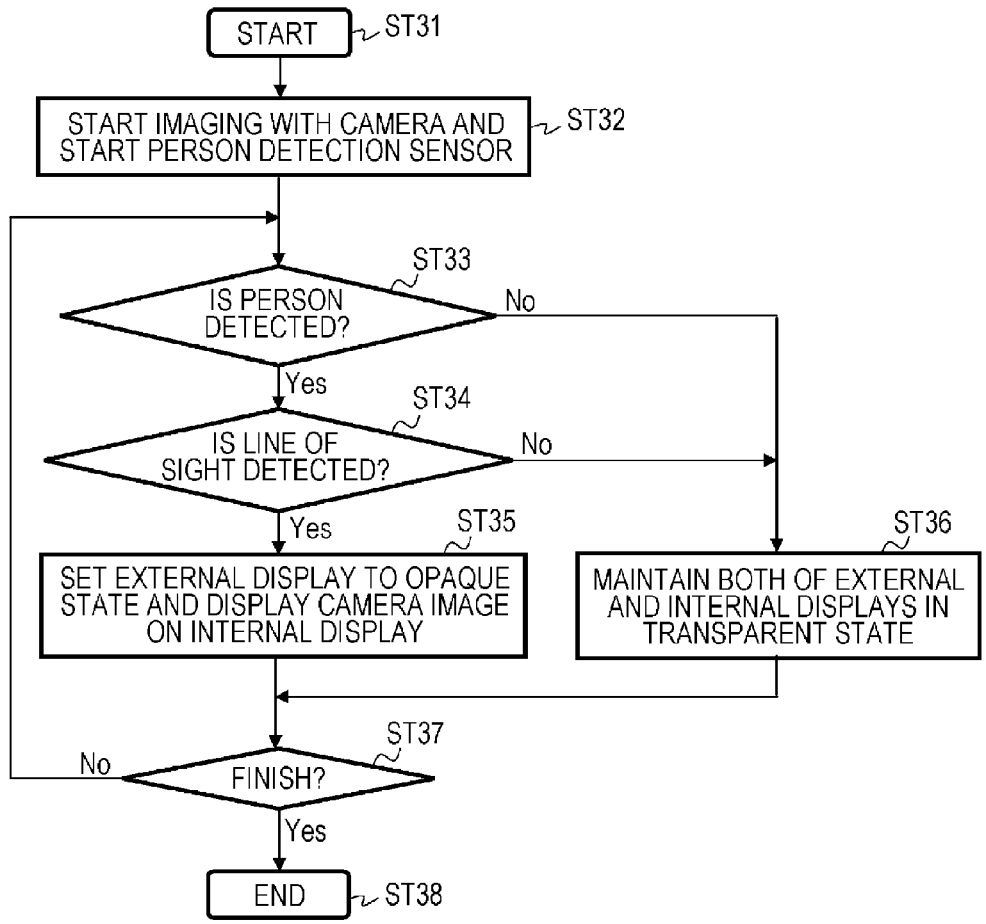
[Fig. 17]
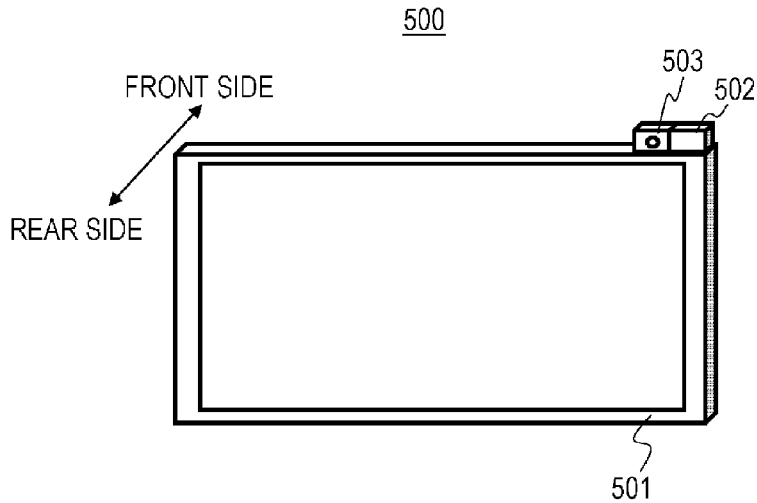

[Fig. 18]
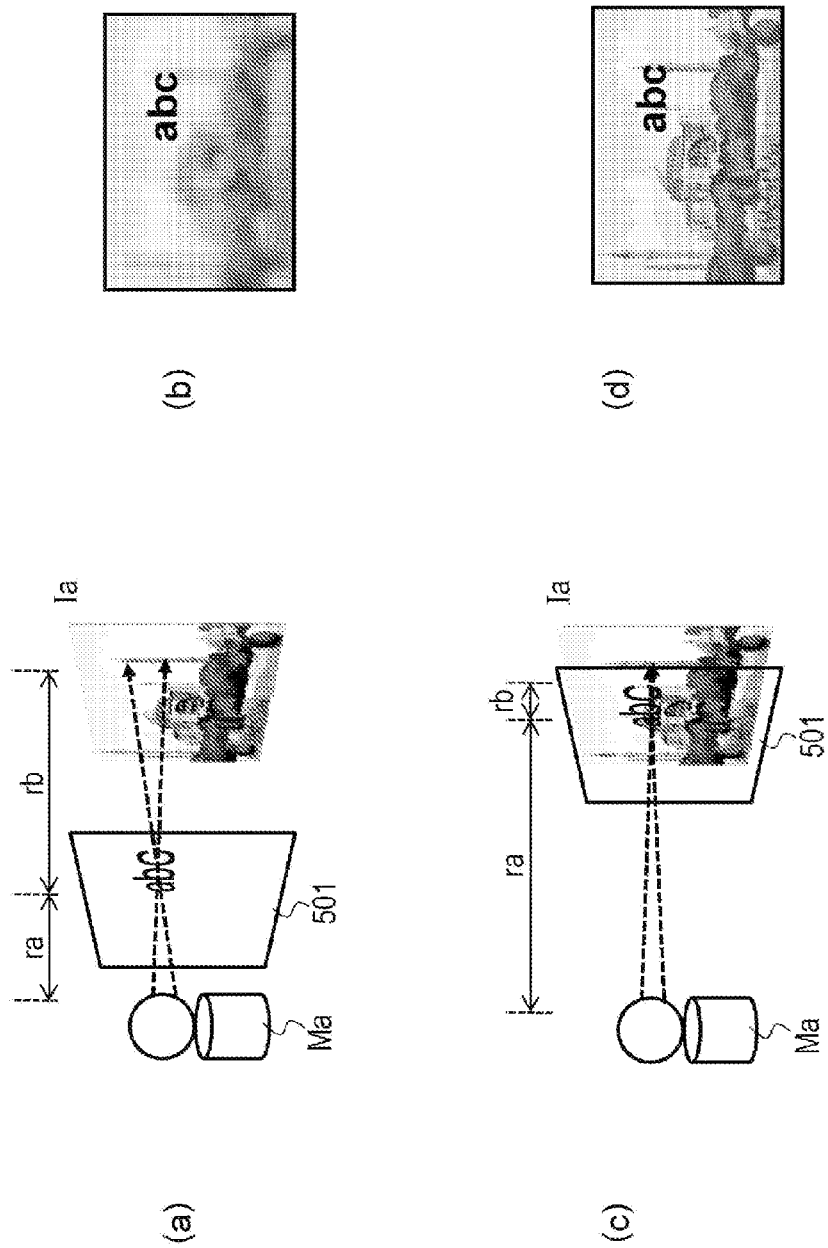

[Fig. 19]
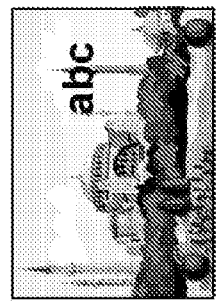
(b)
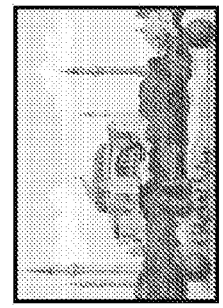
(d)
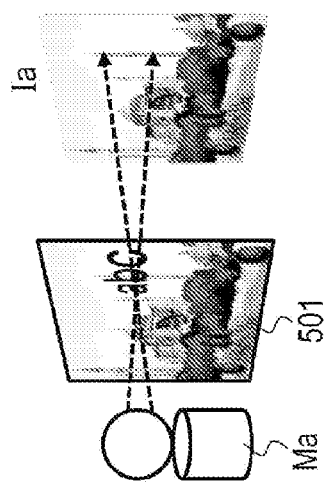
(a)
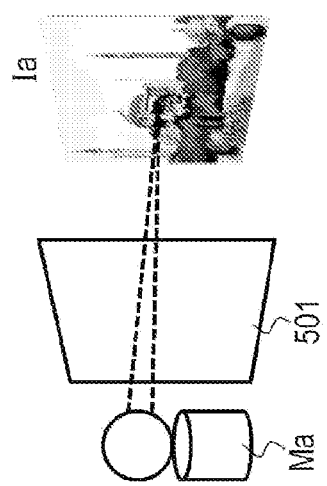
(c)

[Fig. 20]
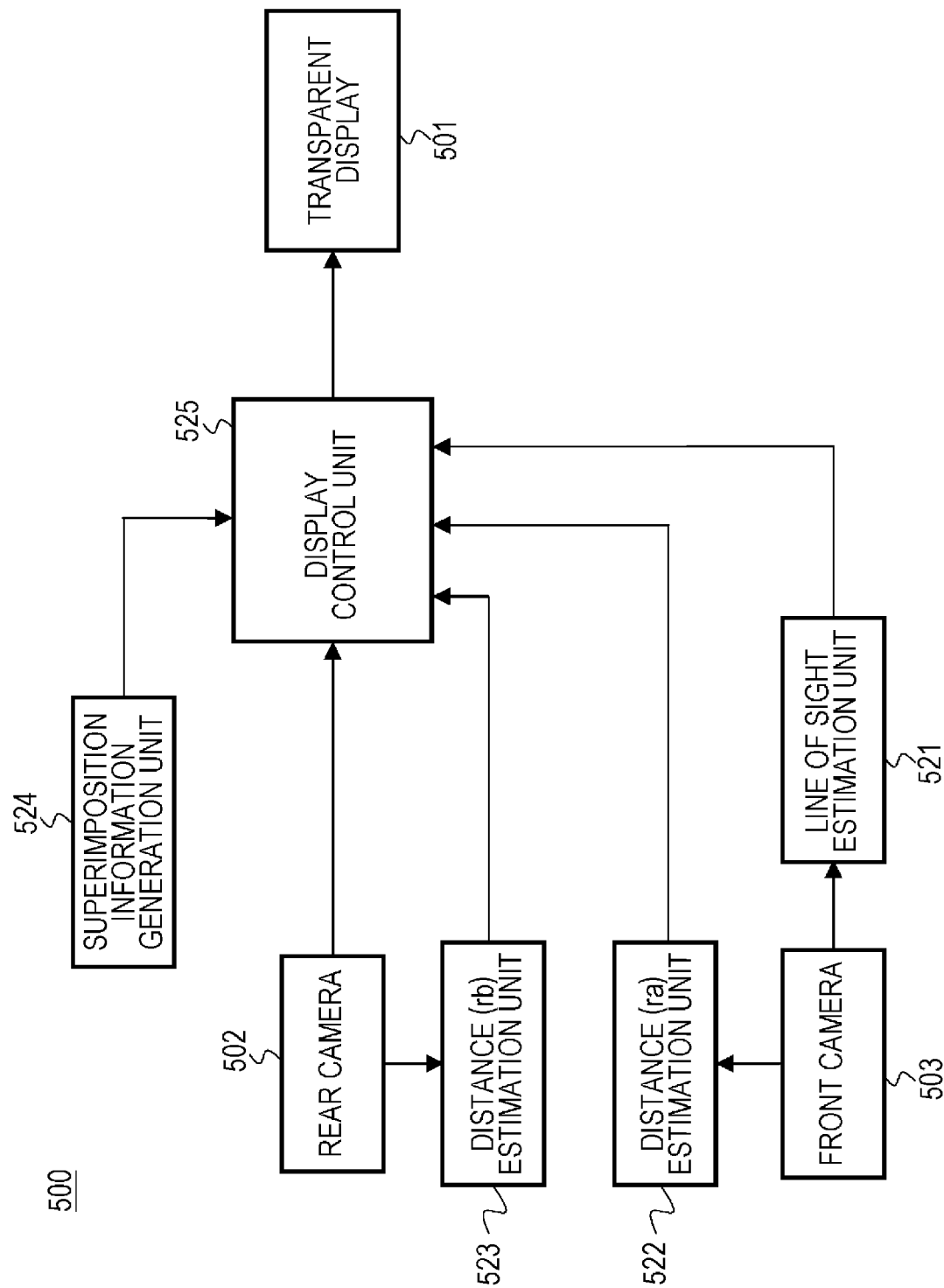

[Fig. 21]
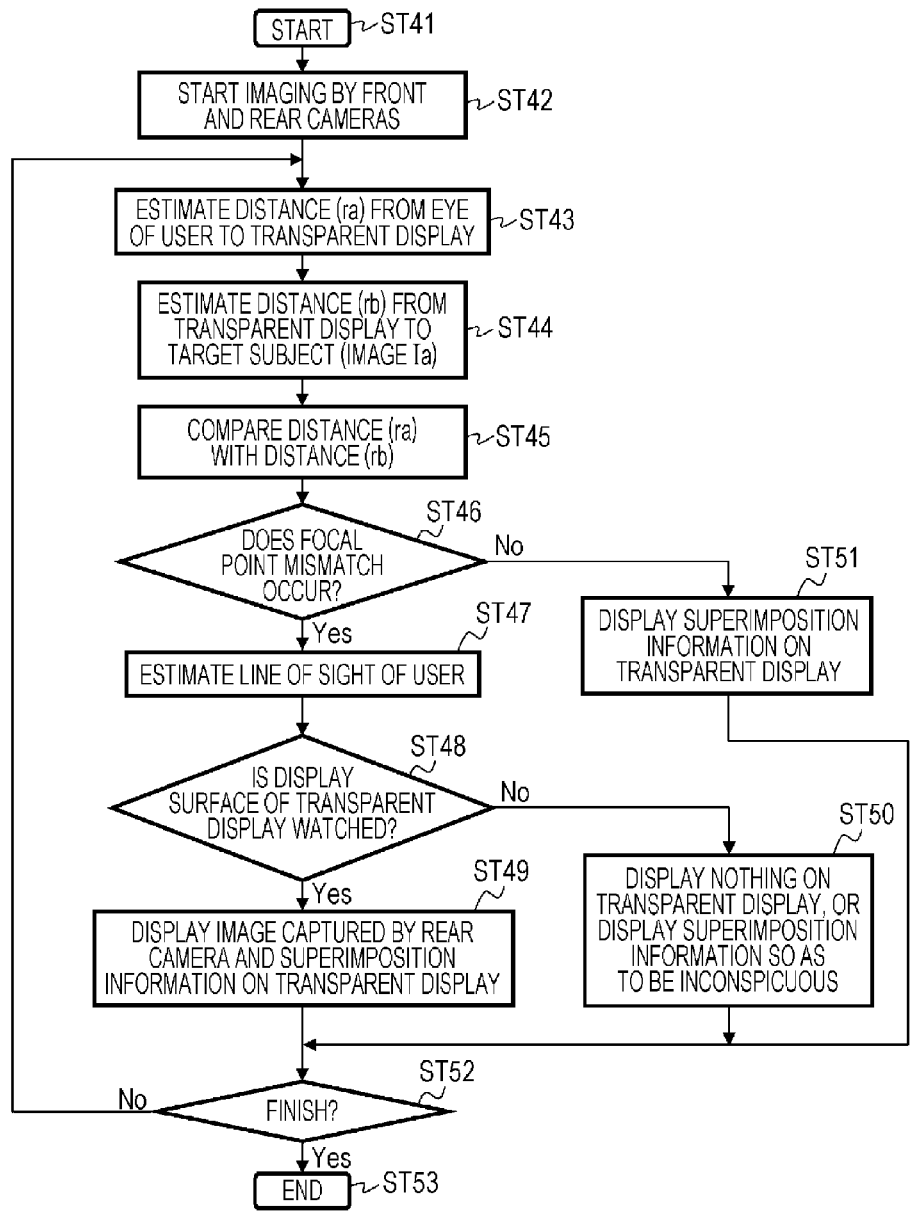

[Fig. 22]
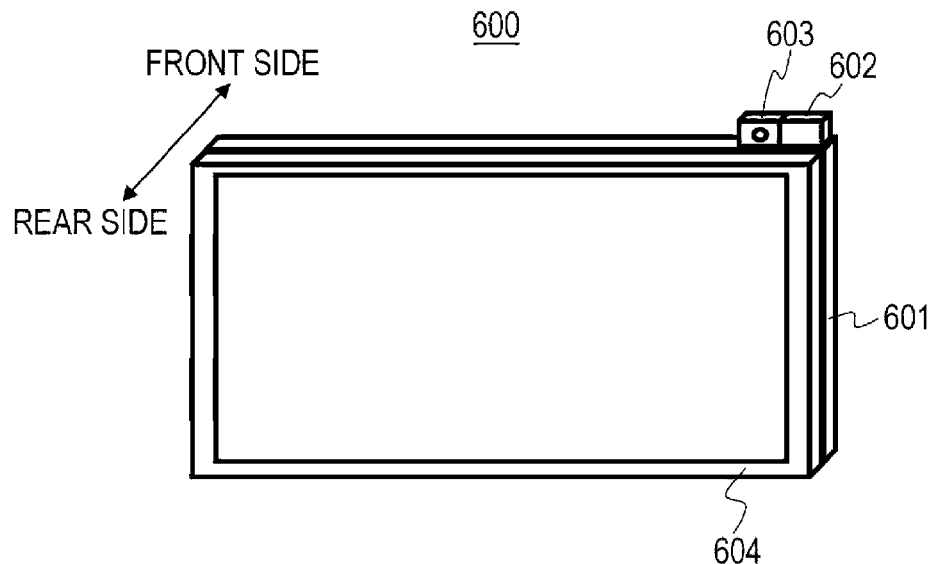
[Fig. 23]
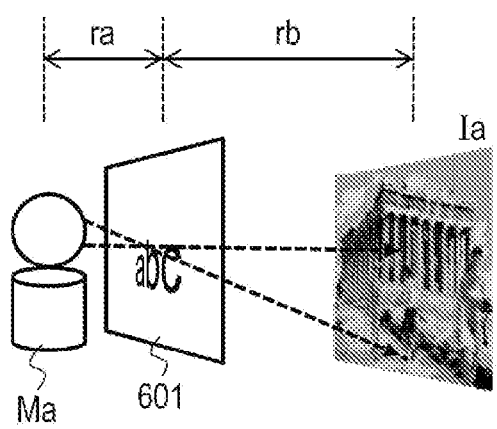

[Fig. 24]
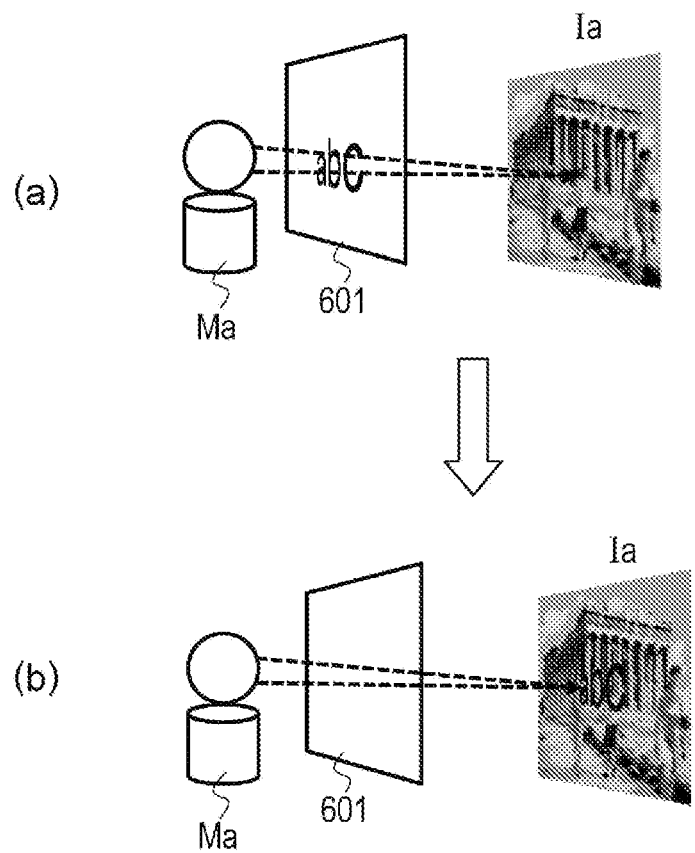

[Fig. 25]
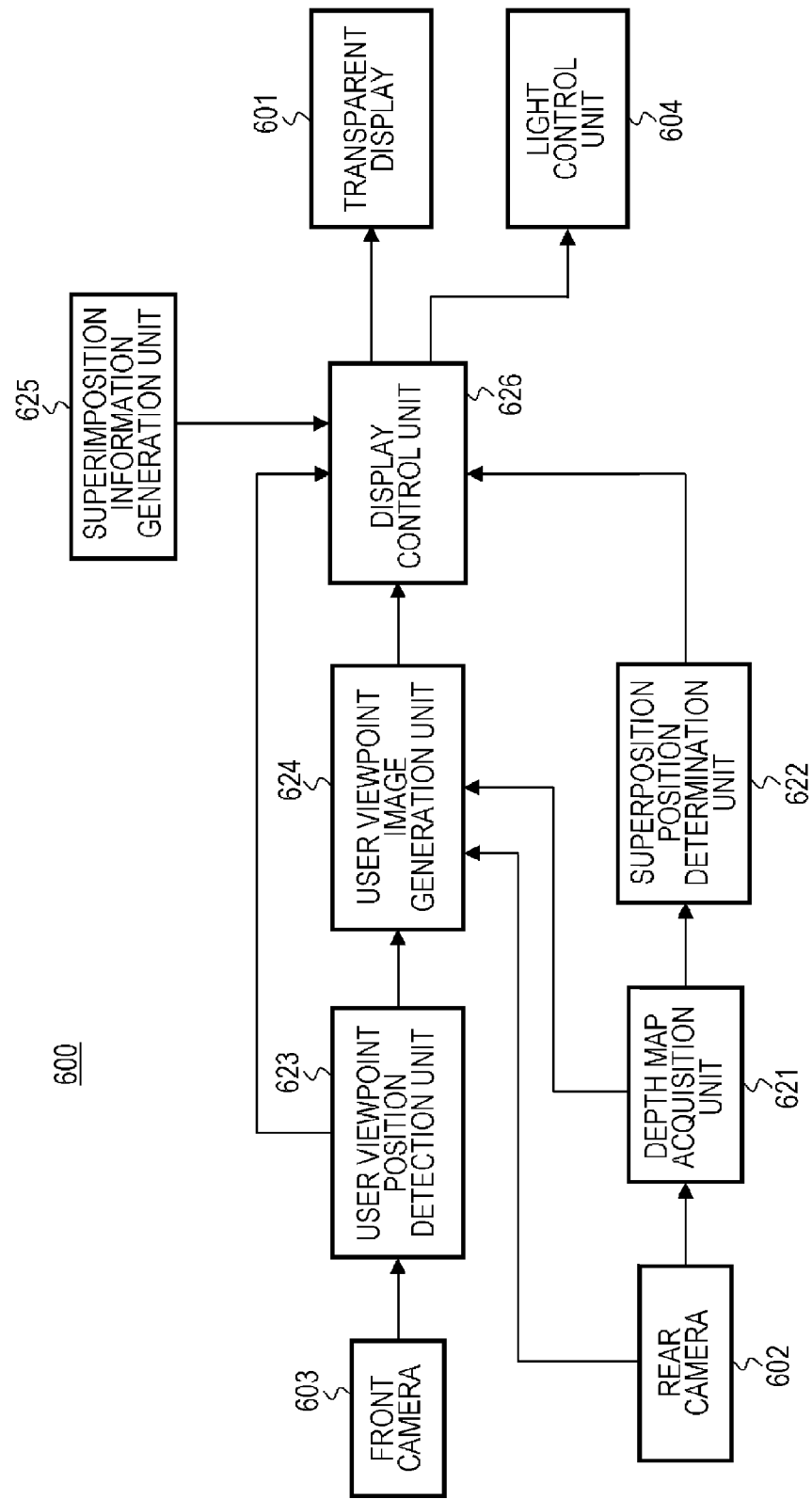

[Fig. 26]
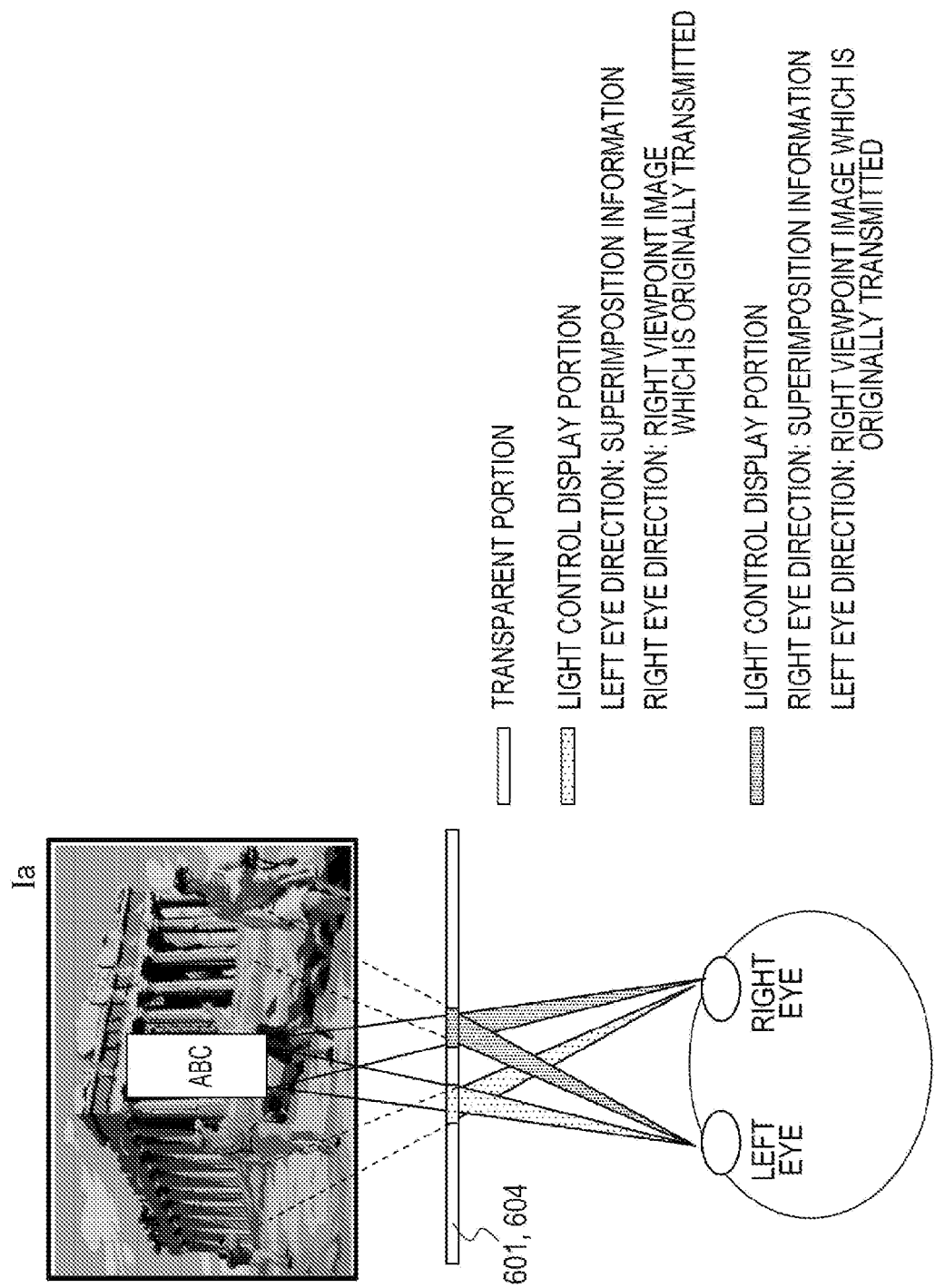

[Fig. 27]
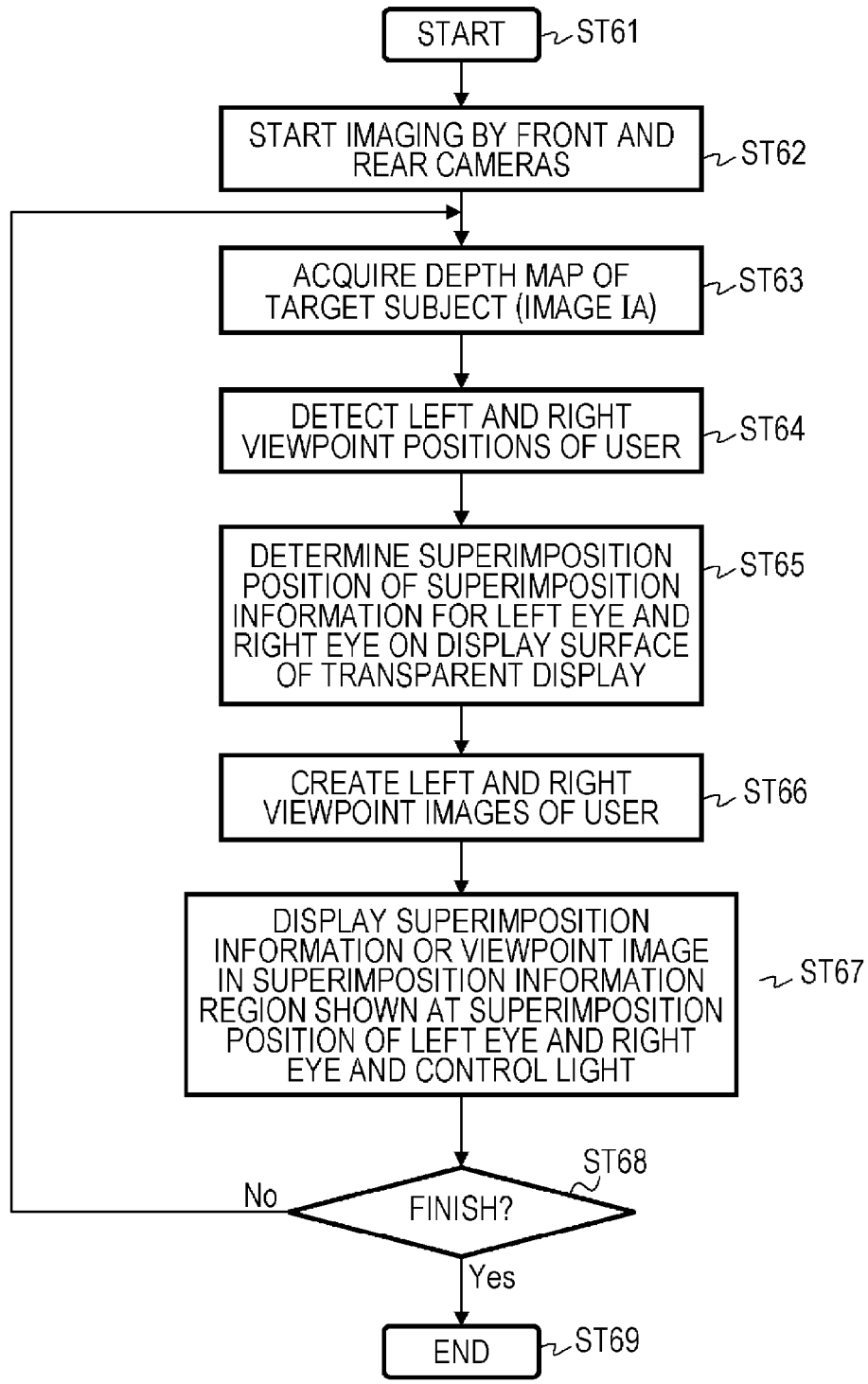

DISPLAY APPARATUS AND DISPLAY CONTROL METHOD

TECHNICAL FIELD

The present technology relates to a display device and a display control method, and a non-transitory computer readable medium, and particularly to a display apparatus or the like configured using a transparent display.

BACKGROUND ART

In the related art, a display apparatus configured using a transparent display has been proposed (for example, refer to PTL 1). In a case of the display apparatus, a user can observe an image on the front side through the transparent display, and information on letters or images (superposition information) related to the observed image can be displayed on the transparent display.

CITATION LIST

Patent Literature

PTL 1: Japanese Unexamined Patent Application Publication No. 2010-108647

SUMMARY OF INVENTION

Technical Problem

An object of the present technology is to improve the convenience of a display apparatus configured using a transparent display.

Solution to Problem

According to one embodiment, an apparatus includes a display controller configured to control a display state of a transparent display based on a sensor output that contains information regarding an object separated from the apparatus.

Advantageous Effects of Invention

According to the present technology, it is possible to improve convenience of a display apparatus configured using a transparent display.

BRIEF DESCRIPTION OF DRAWINGS

FIG. 1 is a diagram schematically illustrating an exterior of a display apparatus according to a first embodiment.

FIG. 2 is a diagram illustrating an example of the image Ia observed by a user through a transparent display, and illustrating that the hand of the user included in the image Ia is deleted.

FIG. 3 is a diagram illustrating a circuit configuration example of the display apparatus according to the first embodiment.

FIG. 4 is a flowchart illustrating an example of the process procedures in a foreign substance removing mode of the display apparatus.

FIG. 5 is a diagram schematically illustrating an exterior of a display apparatus according to a second embodiment.

FIG. 6 is a diagram illustrating an example of the image Ia observed by a user through a transparent display, and illustrating that a predetermined object included in the image Ia is deleted.

FIG. 7 is a diagram illustrating a circuit configuration example of the display apparatus according to the second embodiment.

FIG. 8 is a flowchart illustrating an example of the process procedures in a foreign substance removing mode of the display apparatus.

FIG. 9 is a diagram schematically illustrating an exterior of a display apparatus according to a third embodiment.

FIG. 10 is a diagram illustrating an example of a view observed by a user Ma (View from the user) located on the rear side of the transparent display and illustrating an example of a view observed by another person Mb (View from others) located on the front side of the transparent display.

FIG. 11 is a diagram illustrating a circuit configuration example of the display apparatus according to the third embodiment.

FIG. 12 is a flowchart illustrating an example of the process procedures in a privacy protecting mode of the display apparatus.

FIG. 13 is a diagram schematically illustrating an exterior of a display apparatus according to a fourth embodiment.

FIG. 14 is a diagram illustrating that a user Ma located on the rear side of the transparent display can observe an image Ia on the front side, and another person Mb located on the front side of the transparent display can observe the user Ma and the like located on the rear side.

FIG. 15 is a diagram illustrating a circuit configuration example of the display apparatus according to the fourth embodiment.

FIG. 16 is a flowchart illustrating an example of the process procedures in a privacy protecting mode of the display apparatus.

FIG. 17 is a diagram schematically illustrating an exterior of a display apparatus according to a fifth embodiment.

FIG. 18 is a diagram illustrating an example of the state where a user Ma located on the rear side of the transparent display observes an image Ia through the transparent display.

FIG. 19 is a diagram illustrating display of the transparent display in a case where a user watches a display surface of the transparent display.

FIG. 20 is a diagram illustrating a circuit configuration example of the display apparatus according to the fifth embodiment.

FIG. 21 is a flowchart illustrating an example of the process procedures in a focal point mismatch improving mode of the display apparatus.

FIG. 22 is a diagram schematically illustrating an exterior of a display apparatus according to a sixth embodiment.

FIG. 23 is a diagram illustrating an example of the state where a user Ma located on the rear side of the transparent display observes an image Ia through the transparent display.

FIG. 24 is a diagram illustrating that superposition information displayed on the display surface of the transparent display is perceived at almost the same position as that of the image Ia by the user Ma.

FIG. 25 is a diagram illustrating a circuit configuration example of the display apparatus according to the sixth embodiment.

FIG. 26 is a diagram illustrating a relationship between superposition information regions of the left eye and the right eye, that is, light control display portions, and superposition information displayed therein or irradiation of the respective viewpoint images to the left eye and the right eye.

FIG. 27 is a flowchart illustrating an example of the process procedures in a display position adjusting mode of the display apparatus.

DESCRIPTION OF EMBODIMENTS

Hereinafter, embodiments of the invention will be described. In addition, the description will be made in the following order.

1. First Embodiment
2. Second Embodiment
3. Third Embodiment
4. Fourth Embodiment
5. Fifth Embodiment
6. Sixth Embodiment
7. Modified Examples 1. First Embodiment "Configuration Example of Display Apparatus"

FIG. 1 schematically shows an exterior of a display apparatus 100 according to the first embodiment. The display apparatus 100 configures a mobile apparatus. The display apparatus 100 includes a transparent display 101. On the upper end of the transparent display 101, a rear camera (rear image sensor) 102 and a front camera (front image sensor) 103 are disposed so as to be adjacent to each other. The rear camera 102 captures an image on the front side of the transparent display 101. The front camera 103 captures an image on the rear side of the transparent display 101. In addition, a touch panel 104 is disposed on a surface of the front side of the transparent display 101.

FIG. 2(a) shows an example of the image Ia observed by a user through the transparent display 101. In this case, the hand (a part thereof) 105 of a user is located on the front side of the transparent display 101, and a part of the hand 105 covers the transparent display 101 and is included in the image Ia as a foreign substance. In the display apparatus 100, as shown in FIG. 2(b), it is possible to delete the hand 105 of the user included in the image Ia.

FIG. 3 shows a circuit configuration example of the display apparatus 100 according to the first embodiment. The display apparatus 100 includes the transparent display 101, the rear camera 102, the front camera 103, and the touch panel 104. In addition, the display apparatus 100 includes a viewpoint estimation unit 121, a region estimation unit 122, a captured image storage unit 123, an interpolated image creation unit 124, a display control unit 125, and a superposition information generation unit 126.

The viewpoint estimation unit 121 estimates a viewpoint (a position of the eye) of a user on the basis of a captured image obtained by the front camera 103. The region estimation unit 122 detects a region of the hand 105 of the user as a foreign substance region from an output of the touch panel 104. In addition, the region estimation unit 122 estimates an image region corresponding to the region of the hand 105 of the user from the captured image obtained by the rear camera 102 on the basis of information on the region of the hand 105 of the user and viewpoint information obtained by the viewpoint estimation unit 121.

The captured image storage unit 123 stores captured images obtained by the rear camera 102, corresponding to a predetermined frame period. The interpolated image creation unit 124 cuts an image of the portion corresponding to the region of the hand 105 of the user from the captured image stored in the captured image storage unit 123 so as to create an interpolated image, on the basis of the region estimation result of the region estimation unit 122. The superposition information generation unit 126 generates superposition information such as letters or an image displayed on the transparent display 101.

The superposition information is, for example, information related to a predetermined object included in an image on the front side observed by the user through the transparent display 101. The superposition information may be automatically acquired from a server device on the Internet using a communication function (not shown), for example, by recognizing a predetermined object from a captured image obtained by the rear camera 102 as an image and by using the recognition result. In this case, there may be a configuration in which a captured image obtained by the rear camera 102 is transmitted to a server device on the cloud (on the Internet) using a communication function, the server device performs image recognition, and superposition information is received from the server device. The matters regarding the above superposition information are also the same for the following other embodiments.

The display control unit 125 (e.g., a programmable processor or other processing circuitry) displays superposition information on the transparent display 101 when the superposition information generation unit 126 generates the superposition information. In addition, the display control unit 125 displays an interpolated image created by the interpolated image creation unit 124 only in a region of the hand 105 of the user of the transparent display 101 in a foreign substance removing mode.

A brief description will be made of an operation of the display apparatus 100 shown in FIG. 3. A captured image obtained by the rear camera 102 capturing an image on the front side of the transparent display 101 is temporarily stored in the captured image storage unit 123. In addition, a captured image obtained by the front camera 103 capturing an image on the front side of the transparent display 101 is supplied to the viewpoint estimation unit 121. The viewpoint estimation unit 121 estimates a viewpoint of the user on the basis of the captured image obtained by the front camera 103. The viewpoint estimation result is supplied to the region estimation unit 122.

An output of the touch panel 104 is supplied to the region estimation unit 122. The region estimation unit 122 detects the region of the hand 105 of the user as a foreign substance region from the output of the touch panel 104. In addition, in the region estimation unit 122, an image region corresponding to the region of the hand 105 of the user is estimated from the captured image obtained by the rear camera 102 on the basis of the information on the region of the hand 105 of the user and the viewpoint information obtained by the viewpoint estimation unit 121. The region estimation result is supplied to the interpolated image creation unit 124.

In the interpolated image creation unit 124, an image of a portion corresponding to the region of the hand 105 of the user is cut from the captured image stored in the captured image storage unit 123 and an interpolated image (replacement) is created based on the region estimation result from the region estimation unit 122. The display control unit 125 displays the interpolated image created by the interpolated image creation unit 124 only in the region of the hand 105 of the user of the transparent display 101 in a foreign substance removing mode. Thereby, the hand 105 of the user included in the image Ia observed by the user through the transparent display 101 is deleted (refer to FIG. 2(b)).

Further, the display control unit 125 displays superposition information on the transparent display 101 when the superposition information generation unit 126 generates the superposition information.

A flowchart of FIG. 4 shows an example of the process procedures in a foreign substance removing mode of the display apparatus 100 shown in FIGS. 1 and 3. The display apparatus 100 starts the process in step ST1, and, then, starts imaging by the rear camera 102 and the front camera 103 and activates the touch panel 104 in step ST2.

Next, in step ST3, the display apparatus 100 detects a region covered by the hand 105 in touch panel 104. Next, in step ST4, the display apparatus 100 estimates and cuts a scene (image) of the region covered by the hand from the captured image obtained by the rear camera 102. Next, in step ST5, the display apparatus 100 displays the image cut in step ST4 only in the region covered by the hand.

Next, the display apparatus 100 determines whether or not the foreign substance removing mode finishes in step ST6. Whether or not the foreign substance removing mode finishes is determined based on, for example, an explicit instruction operation of the user, although a user operation unit is not shown in FIG. 3. If it is determined that the mode does not finish, the display apparatus 100 returns to the process in step ST3 and repeatedly performs the above-described processes. On the other hand, if it is determined that the mode finishes, the display apparatus 100 ends the process in step ST7.

As described above, in the display apparatus 100 shown in FIG. 1, in the foreign substance removing mode, an image of a portion corresponding to a region of the hand 105 of the user of the captured image obtained by the rear camera 102 is displayed only in the region of the hand 105 of the user included in the image Ia observed by the user through the transparent display 101. For this reason, the hand 105 of the user is removed from the image Ia observed by the user through the transparent display 101, thereby improving an ambient property.

2. Second Embodiment

"Configuration Example of Display Apparatus"

FIG. 5 schematically shows an exterior of a display apparatus 200 according to the second embodiment. The display apparatus 200 configures a mobile apparatus. The display apparatus 200 includes a transparent display 201. On the upper end of the transparent display 201, a rear camera (rear image sensor) 202 and a front camera (front image sensor) 203 are disposed so as to be adjacent to each other. The rear camera 202 captures an image on the front side of the transparent display 201. The front camera 203 captures an image on the rear side of the transparent display 201. In addition, a touch panel 204 is disposed on a surface of the front side of the transparent display 201.

FIG. 6(*a*) shows an example of the image Ia observed by a user through the transparent display 201. In this case, an object 205 is included in the image Ia as a foreign substance. In the display apparatus 100, as shown in FIG. 6(*b*), it is possible to delete the object 205 included in the image Ia.

FIG. 7 shows a circuit configuration example of the display apparatus 200 according to the second embodiment. The display apparatus 200 includes the transparent display 201, the rear camera 202, the front camera 203, and the touch panel 204. In addition, the display apparatus 200 includes a viewpoint estimation unit 221, a region estimation unit 222, a captured image storage unit 223, an interpolated image creation unit 224, a display control unit 225, and a superposition information generation unit 226.

The touch panel 204 is used to designate a predetermined object 205 from the image Ia observed by the user through the transparent display 201. In this respect, the touch panel 201 configures an object designation unit. The viewpoint estimation unit 221 estimates a viewpoint of the user on the basis of the captured image obtained by the front camera 103. The region estimation unit 222 detects the object region including the object 205 designated in the touch panel 204 as a foreign substance region. In addition, the region estimation unit 222 estimates an image region corresponding to the object region of the captured image obtained by the rear camera 202 on the basis of the information on the object region and the viewpoint information obtained by the viewpoint estimation unit 221.

The captured image storage unit 223 stores captured images obtained by the rear camera 202, corresponding to a predetermined frame period. The interpolated image creation unit 224 creates an interpolated image on the basis of the region estimation result from the region estimation unit 222. In this case, when the object 205 moves, the interpolated image creation unit 224 cuts an image of the portion corresponding to the object region from a captured image of the past frame in which the object 205 does not exist of the captured images stored in the captured image storage unit 223, so as to create an interpolated image (replacement image). In addition, when the object 205 does not move, the interpolated image creation unit 224 creates an interpolated image (replacement image) by using peripheral pixels of the object region.

The display control unit 225 displays superposition information on the transparent display 201 when the superposition information generation unit 226 generates the superposition information. In addition, the display control unit 225 displays the interpolated image created by the interpolated image creation unit 224 only in the object region of the transparent display 201 in a foreign substance removing mode.

A brief description will be made of an operation of the display apparatus 200 shown in FIG. 7. A captured image obtained by the rear camera 202 capturing an image on the front side of the transparent display 201 is temporarily stored in the captured image storage unit 223. In addition, a captured image obtained by the front camera 203 capturing an image on the front side of the transparent display 201 is supplied to the viewpoint estimation unit 221. The viewpoint estimation unit 221 estimates a viewpoint of the user on the basis of the captured image obtained by the front camera 203. The viewpoint estimation result is supplied to the region estimation unit 222.

By the use of the touch panel 204, the user designates an object 205 desired to be removed from the image Ia observed by the user through the transparent display 201. The region estimation unit 222 detects an object region including the object designated in the touch panel 204 as a foreign substance region. In addition, the region estimation unit 222 estimates an image region corresponding to the object region from the captured image obtained by the rear camera 202 on the basis of the information on the object region and the viewpoint information obtained by the viewpoint estimation unit 221. The region estimation result is supplied to the interpolated image creation unit 224.

The interpolated image creation unit 124 creates an interpolated image (replacement image) on the basis of the region estimation result from the region estimation unit 222. In this case, when the object 205 moves, the interpolated image creation unit 224 cuts an image of the portion corresponding to the object region from a captured image, of the past frame in which the object 205 does not exist, of the captured images stored in the captured image storage unit 223, so as to create an interpolated image (replacement image). On the other hand, when the object 205 does not move, the interpolated image creation unit 224 creates an interpolated image (replacement image) by using peripheral pixels of the object region.

The display control unit 225 displays the interpolated image created by the interpolated image creation unit 224 only in the object region of the transparent display 201 in a foreign substance removing mode. Thereby, the object 205 included in the image Ia observed by the user through the transparent display 201 is deleted (refer to FIG. 6(b)). In addition, the display control unit 225 displays superposition information on the transparent display 201 when the superposition information generation unit 226 generates the superposition information.

A flowchart of FIG. 8 shows an example of the process procedures in a foreign substance removing mode of the display apparatus 200 shown in FIGS. 5 and 7. The display apparatus 200 starts the process in step ST11, and, then, proceeds to a process in step ST12. In step ST12, the display apparatus 200 starts imaging with the rear camera 202 and the front camera 203 and activates the touch panel 204.

Next, in step ST13, the display apparatus 200 designates an object 205 which is desired to be deleted from an image observed through the transparent display 201 by the user operating the touch panel 204. In addition, in step ST14, the display apparatus 200 determines whether or not the designated object moves. For example, a motion vector of the object 205 is detected based on a captured image obtained by the rear camera 202, thereby determining whether or not the object 205 moves.

If it is determined that the object 205 moves, in step ST15, the display apparatus 200 creates an interpolated image (replacement image) corresponding to the object region by using the past frame in which the object 205 does not exist of the captured images obtained by the rear camera 202. On the other hand, it is determined that the object 205 does not move, in step ST16, the display apparatus 200 creates an interpolated image (replacement image) corresponding to the object region by using peripheral pixels of the object region 205 of the captured images obtained by the rear camera 202.

The display apparatus 200 performs the process in step ST15 or ST16, and then proceeds to a process in step ST17. In step ST17, the display apparatus 200 displays the interpolated image created in step ST15 or ST16 only in the object region.

Next, the display apparatus 200 determines whether or not the foreign substance removing mode finishes in step ST18. Whether or not the foreign substance removing mode finishes is determined based on, for example, an explicit instruction operation of the user, although a user operation unit is not shown in FIG. 7. If it is determined that the mode does not finish, the display apparatus 200 returns to the process in step ST13 and repeatedly performs the above-described processes. On the other hand, if it is determined that the mode finishes, the display apparatus 200 ends the process in step ST19.

As described above, in the display apparatus 200 shown in FIG. 5, in the foreign substance removing mode, an interpolated image (replacement image) created based on the captured image obtained by the rear camera 202 is displayed only in the region of the object 105, designated by the user, included in the image Ia observed by the user through the transparent display 101. For this reason, the designated object 105 is removed from the image Ia observed by the user through the transparent display 201, thereby improving an ambient property.

3. Third Embodiment

"Configuration Example of Display Apparatus"

FIG. 9 schematically shows an exterior of a display apparatus 300 according to the third embodiment. The display apparatus 300 configures a mobile apparatus. The display apparatus 300 includes a transparent display 301. On the upper end of the transparent display 301, a rear camera (rear image sensor) 302 and a front camera (front image sensor) 303 are disposed so as to be adjacent to each other. The rear camera 302 captures an image on the front side of the transparent display 301. The front camera 303 captures an image on the rear side of the transparent display 301.

FIG. 10 shows an example of the view (View from the user) in a case where a user Ma located on the rear side of the transparent display 301 observes an image Ia on the front side of the transparent display 301. In this view (hereinafter, appropriately referred to as a "user view"), another person Mb are included in addition to the image Ia, and superposition information (character information in the shown example) such as letters or images displayed on the transparent display 301 is also included.

In addition, FIG. 10 shows an example of the view (View from others) in a case where another person Mb located on the front side of the transparent display 301 observes an image Ib on the rear side of the transparent display 301. In this view (hereinafter, appropriately referred to as an "another person view"), in addition to the image Ib, the user Ma is included, and superposition information (character information in the shown example) such as letters or images displayed on the transparent display 301 is also included.

In the display apparatus 300, when a line of sight of the another person Mb is directed to the superposition information displayed on the transparent display 301, it is possible to set a display color of the superposition information to a color corresponding to color information of a region in a line of sight direction of the image Ib.

FIG. 11 shows a circuit configuration example of the display apparatus 300 according to the third embodiment. The display apparatus 300 includes the transparent display 301, the rear camera 302, and the front camera 303. In addition, the display apparatus 300 includes a line of sight estimation unit 321, a color information acquisition unit 322, a superposition information generation unit 323, a superposition information processing unit 324, and a display control unit 325.

The line of sight estimation unit 321 estimates a line of sight direction of another person Mb on the basis of a captured image obtained by the rear camera 302. The estimation of a line of sight direction may employ a technique disclosed in, for example, ""Passive Driver Gaze Tracking with Active Appearance Models" T. Ishikawa, S. Baker, I. Matthews, and T. Kanade Proceedings of the 11th World Congress on Intelligent Transportation Systems, October, 2004", or the like.

The color information acquisition unit 322 acquires color information of a region in the line of sight direction from a captured image obtained by the front camera 303 when the direction of the line of sight of another person Mb estimated by the line of sight estimation unit 321 is a line of sight toward superposition information (letters, images, or the like) displayed on the transparent display 301. The region in the line of sight direction is an image region which is observed through the transparent display 301 and is located in the background of the superposition information when another person Mb's line of sight is directed to the superposition information displayed on the transparent display 301.

The superposition information generation unit 323 generates superposition information (letters, images, or the like) displayed on the transparent display 301. The superposition information processing unit 324 performs a color changing process such that the superposition information generated by a display color of the superposition information generation unit 323 becomes a color corresponding to color information acquired by the color information acquisition unit 322 in a privacy protecting mode. In addition, the superposition information processing unit 324 outputs the superposition information generated by the superposition information generation unit 323 as it is without performing a color changing process when not in the privacy protecting mode. The display control unit 325 displays the superposition information having passed through the superposition information processing unit 324 on the transparent display 301 when the superposition information generation unit 323 generates the superposition information.

A brief description will be made of an operation of the display apparatus 300 shown in FIG. 11. A captured image obtained by the rear camera 302 capturing an image on the front side of the transparent display 301 is supplied to the line of sight estimation unit 321. The line of sight estimation unit 321 processes the captured image, and estimates a line of sight if another person Mb exists in the captured image. The estimation result of a line of sight direction is supplied to the color information acquisition unit 322.

In addition, a captured image obtained by the front camera 303 capturing an image on the rear side of the transparent display 301 is supplied to the color information acquisition unit 322. The color information acquisition unit 322 acquires color information of a region in the line of sight direction from a captured image obtained by the front camera 303 when the direction of the line of sight of another person Mb estimated by the line of sight estimation unit 321 is a line of sight toward superposition information (letters, images, or the like) displayed on the transparent display 301. The color information is supplied to the superposition information processing unit 324.

The superposition information processing unit 324 performs a color changing process such that the superposition information generated by a display color of the superposition information generation unit 323 becomes a color corresponding to color information acquired by the color information acquisition unit 322 when another person Mb's line of sight is directed to the superposition information displayed on the transparent display 301 in a privacy protecting mode. On the other hand, the superposition information processing unit 324 outputs the superposition information generated by the superposition information generation unit 323 as it is when not in the privacy protecting mode.

The display control unit 325 displays the superposition information having undergone the color changing process in the superposition information processing unit 524 on the transparent display 301 when another person Mb's line of sight is directed to the superposition information displayed on the transparent display 301 in a privacy protecting mode. For this reason, it is difficult for another person Mb to understand the superposition information displayed on the transparent display 301. In addition, when not in the privacy protecting mode, or when another person Mb's line of sight is not directed to the superposition information displayed on the transparent display 301, the superposition information generated by the superposition information generation unit 323 is displayed on the transparent display 301 as it is.

A flowchart of FIG. 12 shows an example of the process procedures in a privacy protecting mode of the display apparatus 300 shown in FIGS. 9 and 11. The display apparatus 300 starts the process in step ST21, and, then, proceeds to a process in step ST22. In step ST22, the display apparatus 300 starts imaging with the rear camera 302 and the front camera 303. Further, in step ST23, a line of sight direction of another person Mb is estimated from an image captured by the rear camera 302.

In step ST24, the display apparatus 300 determines whether or not the line of sight direction is toward to superposition information displayed on the transparent display 301. When the line of sight direction is directed to the superposition information, the display apparatus 300 acquires color information of a region in the line of sight direction from a captured image obtained by the front camera 303 in step ST25. In addition, in step ST26, the display apparatus 300 performs a color changing process for the superposition information such that a display color thereof becomes a color corresponding to the color information, so as to be displayed. On the other hand, when the line of sight direction is not directed to the superposition information, the display apparatus 300 displays the superposition information generated by the superposition information generation unit 323 as it is without performing a color changing process in step ST27.

Next, the display apparatus 300 determines whether or not the privacy protecting mode finishes in step ST28. Whether or not the privacy protecting mode finishes is determined based on, for example, an explicit instruction operation of the user, although a user operation unit is not shown in FIG. 11. If it is determined that the mode does not finish, the display apparatus 300 returns to the process in step ST23 and repeatedly performs the above-described processes. On the other hand, if it is determined that the mode finishes, the display apparatus 300 ends the process in step ST29.

As described above, in the display apparatus 300 shown in FIG. 9, in the privacy protecting mode, when another person Mb's line of sight is directed to superposition information displayed on the transparent display 301, the superposition information having undergone a color changing process is displayed on the transparent display 301. For this reason, it is difficult for another person Mb to understand the superposition information displayed on the transparent display 301, thereby improving privacy protection.

4. Fourth Embodiment

"Configuration Example of Display Apparatus"

FIG. 13 schematically shows an exterior of a display apparatus 400 according to the fourth embodiment. The display apparatus 400 configures a mobile apparatus. The display apparatus 400 includes a transparent display 401. The transparent display 401 is constituted by a front side transparent display 401R and a rear side transparent display 401F. On the upper end of the transparent display 401, a rear camera (rear image sensor) 402 and a person detecting sensor 403 are disposed so as to be adjacent to each other. The rear camera 402 captures an image on the front side of the transparent display 401. The person detection sensor 403 detects people present in a predetermined range on the front side of the transparent display 401.

FIG. 14(a) shows that a user Ma located on the rear side of the transparent display 401 can observe an image Ia on the front side through the transparent display 401. In addition, FIG. 14(b) shows that another person Mb located on the front side of the transparent display 401 can observe the user Ma and the like located on the rear side through the transparent display 401.

In the display apparatus 400, when the presence of another person Mb is detected, and there is a line of sight directed to the transparent display 401, as shown in FIG. 14(c), a captured image obtained by the rear camera 402 can be displayed on the rear side transparent display 401F, and the front side transparent display 401R can be set to an opaque state as shown in FIG. 14(d).

FIG. 15 shows a circuit configuration example of the display apparatus 400 according to the fourth embodiment. The display apparatus 400 includes the front side transparent display 401R, the rear side transparent display 401F, the rear camera 402, and the person detection sensor 403. In addition, the display apparatus 400 includes a line of sight estimation unit 421, a person detection unit 422, a superposition information generation unit 423, and a display control unit 424.

The line of sight estimation unit 421 estimates a line of sight direction of another person Mb on the basis of a captured image obtained by the rear camera 402. The line of sight estimation unit 421 has the same configuration as the line of sight estimation unit 321 of the above-described display apparatus 300. The person detection unit 422 detects another person Mb existing in a predetermined range on the front side of the transparent display 401 on the basis of an output of the person detection sensor 403.

The superposition information generation unit 423 generates superposition information such as letters or images displayed on the transparent display 401. The display control unit 424 displays the superposition information on the transparent display 401, for example, the rear side transparent display 401F when the superposition information is generated by the superposition information generation unit 423.

In addition, the display control unit 424 determines whether or not to satisfy a condition that another person Mb exists and a line of sight thereof is directed to the transparent display 401 on the basis of the line of sight estimation result from the line of sight estimation unit 421 and the person detection result from the person detection unit 422 in a privacy protecting mode. If it is determined that this condition is satisfied, the display control unit 424 displays a captured image obtained by the rear camera 402 on the rear side transparent display 401F, and sets the front side transparent display 401R to an opaque state.

A brief description will be made of an operation of the display apparatus 400 shown in FIG. 15. An output of the person detection sensor 403 is supplied to the person detection unit 422. In addition, the person detection unit 422 detects people present in a predetermined range on the front side of the transparent display 401 on the basis of an output of the person detection sensor 403. The detection result is supplied to the display control unit 424.

Further, a captured image obtained by the rear camera 402 capturing an image on the front side of the transparent display 401 is supplied to the line of sight estimation unit 421. The line of sight estimation unit 421 processes the captured image, and estimates a line of sight direction if another person Mb exists in the captured image. The estimation result of a line of sight direction is supplied to the display control unit 424.

The superposition information generation unit 423 generates superposition information (letters, images, or the like) displayed on the transparent display 401. The superposition information is supplied to the display control unit 424. The display control unit 424 displays the superposition information on the rear side transparent display 401F.

In addition, the display control unit 424 determines whether or not to satisfy a condition that another person Mb exists and a line of sight thereof is directed to the transparent display 401 on the basis the line of sight estimation result from the line of sight estimation unit 421 and the person detection result from the person detection unit 422 in a privacy protecting mode. If it is determined that this condition is satisfied, a captured image obtained by the rear camera 402 is displayed on the rear side transparent display 401F, and the front side transparent display 401R is set to an opaque state. For this reason, it is difficult for another person Mb to observe the user Ma or the like located on the rear side through the transparent display 401.

A flowchart of FIG. 16 shows an example of the process procedures in a privacy protecting mode of the display apparatus 400 shown in FIGS. 13 and 15. The display apparatus 400 starts the process in step ST31, and, then, proceeds to a process in step ST32. In step ST32, the display apparatus 400 starts imaging with the rear camera 402 and activates the person detection sensor 403.

Next, in step ST33, the display apparatus 400 determines whether or not another person Mb exists in a predetermined range on the front side of the transparent display 401. When another person Mb exists, the display apparatus 400 proceeds to a process in step ST34. In step ST34, the display apparatus 400 determines whether or not another person Mb's line of sight is directed to the transparent display 401.

When another person Mb's line of sight is directed to the transparent display 401, the display apparatus 400 sets the front side transparent display (external display) 401R to an opaque state in step ST35. In addition, at this time, the display apparatus 400 displays a captured image obtained by the rear camera 402 on the rear side transparent display (internal display) 401F. On the other hand, when another person Mb does not exist in step ST33, or another person Mb's line of sight is not directed to the transparent display 401 in step ST34, the display apparatus 400 maintains both the front side transparent display 401R and the rear side transparent display 401 in a transparent state in step ST36.

Next, the display apparatus 400 determines whether or not the privacy protecting mode finishes in step ST37. Whether or not the privacy protecting mode finishes is determined based on, for example, an explicit instruction operation of the user, although a user operation unit is not shown in FIG. 15. If it is determined that the mode does not finish, the display apparatus 400 returns to the process in step ST33 and repeatedly performs the above-described processes. On the other hand, if it is determined that the mode finishes, the display apparatus 400 ends the process in step ST38.

As described above, in the display apparatus 400 shown in FIG. 13, in the privacy protecting mode, when another person Mb exists, and his/her line of sight is directed to the transparent display 401, a captured image obtained by the rear camera 402 is displayed on the rear side transparent display 401F, and the front side transparent display 401R is set to an opaque state. For this reason, it is difficult for another person Mb to observe, through the transparent display 401, the user Ma or the like located on the rear side thereof, thereby improving privacy protection. In this case, it is possible to reduce a sense where the user Ma is viewed by another person Mb.

In the above description, in the privacy protecting mode, when another person Mb exists, and his/her line of sight is directed to the transparent display 401, a captured image obtained by the rear camera 402 is displayed on the rear side transparent display 401F, and the front side transparent display 401R is set to an opaque state. However, when another person Mb exists, a captured image obtained by the rear camera 402 may be displayed on the rear side transparent display 401F, and the front side transparent display 401R may be set to an opaque state. In this case, the condition in which another person Mb's line of sight is directed to the transparent display 401 is not imposed. In that case, the line of sight estimation unit 421 of the display apparatus 400 of FIG. 15 is not necessary.

Further, in the above description, the person detection unit 422 detects another person Mb existing in a predetermined range on the front side of the transparent display 401 on the basis of an output of the person detection sensor 403. However, the person detection unit 403 may recognize (detect) another person Mb existing in a predetermined range on the front side of the transparent display 401 by processing a captured image obtained by the rear camera 402. In that case, the person detection sensor 403 is not necessary.

Further, in the above description, when another person Mb exists, and his/her line of sight is directed to the transparent display 401, a captured image obtained by the rear camera 402 is displayed on the rear side transparent display 401F, and the front side transparent display 401R is set to an opaque state. However, the transparent display 401 may be divided into a plurality of blocks, a captured image obtained by the rear camera 402 may be displayed only in a divided region to which the line of sight is directed on the rear side transparent display 401F, and the front side transparent display 401R may be set to an opaque state. In addition, control may be performed such that the transparency of a divided region to which the line of sight is directed is the minimum, and, the more distant from the divided region, the higher the transparency.

5. Fifth Embodiment

"Configuration Example of Display Apparatus"

FIG. 17 schematically shows an exterior of a display apparatus 500 according to the fifth embodiment. The display apparatus 500 configures a mobile apparatus. The display apparatus 500 includes a transparent display 501. On the upper end of the transparent display 501, a rear camera (rear image sensor) 502 and a front camera (front image sensor) 503 are disposed so as to be adjacent to each other. The rear camera 502 captures an image on the front side of the transparent display 501. The front camera 503 captures an image on the rear side of the transparent display 501.

FIG. 18(a) shows an example of the state where a user Ma located on the rear side of the transparent display 501 observes an image Ia through the transparent display 501. This example shows a state where the distance rb between a display surface of the transparent display 501 and the image Ia is much larger (ra<<rb) than the distance ra between the eye of the user Ma and the display surface of the transparent display 501, and focal point mismatch for the display surface of the transparent display 501 and the image Ia occurs. FIG. 18(b) shows an example of the view observed when the user Ma watches the display surface of the transparent display 501 in that case, and the image Ia is in a blurred state. In addition, although not shown, conversely, in a view observed when the user Ma watches the image Ia, information of the display surface of the transparent display 501 is in a blurred state.

FIG. 18(c) shows an example of the state where the user Ma located on the rear side of the transparent display 501 observes the image Ia through the transparent display 501. This example shows a state where the distance rb between a display surface of the transparent display 501 and the image Ia is much smaller (ra>>rb) than the distance ra between the eye of the user Ma and the display surface of the transparent display 501, and focal point mismatch for the display surface of the transparent display 501 and the image Ia does not occur. FIG. 18(d) shows an example of the view observed when the user Ma watches the display surface of the transparent display 501 or the image Ia in that case, and both information of the display surface of the transparent display 501 and the image Ia are in a clear state.

In the display apparatus 500, in a case where focal point mismatch for the display surface of the transparent display 501 and the image Ia is detected, as shown in FIG. 19(a), when the user watches the display surface of the transparent display 501, a captured image obtained by the rear camera 502 can be displayed on the transparent display 501, and superposition information (letters, images, or the like) can be displayed so as to be superimposed on the captured image. In this case, as shown in FIG. 19(b), both the superposition information and the image Ia are in a clear state in a view observed by the user Ma.

In the display apparatus 500, in a case where focal point mismatch for the display surface of the transparent display 501 and the image Ia is detected, as shown in FIG. 19(c), when the user watches the display surface of the transparent display 501, it is possible for superposition information not to be displayed on the transparent display 501, or for display of the superposition information on the transparent display 501 to be inconspicuous. In this case, as shown in FIG. 19(d), in a view observed by the user Ma, the image Ia is in a state of being clearly displayed without being interrupted by the superposition information displayed on the transparent display 501.

FIG. 20 shows a circuit configuration example of the display apparatus 500 according to the fifth embodiment. The display apparatus 500 includes the transparent display 501, the rear camera 502, and the front camera 503. In addition, the display apparatus 500 includes a line of sight estimation unit 521, a distance estimation unit 522, a distance estimation unit 523, a superposition information generation unit 524, and a display control unit 525.

The line of sight estimation unit 521 estimates line of sight directions of the left eye and the right eye of the user Ma on the basis of a captured image obtained by the front camera 503. The line of sight estimation unit 521 has the same configuration as the line of sight estimation unit 321 of the above-described display apparatus 300. The distance estimation unit 522 estimates the distance ra between the eye of the user Ma and the display surface of the transparent display 501 on the basis of a captured image obtained by the front camera 503. The distance estimation unit 523 estimates the distance rb between the display surface of the transparent display 501 and the image Ia observed by the user Ma through the transparent display 501 on the basis of a captured image obtained by the rear camera 502.

The superposition information generation unit 524 generates superposition information (letters, images, or the like) displayed on the transparent display 501. The display control unit 525 determines whether or not focal point mismatch for the display surface of the transparent display 501 and the image Ia occurs on the basis of the distance estimation results from the distance estimation units 522 and 523 in a focal point mismatch improving mode. The display control unit 525 determines that there is focal point mismatch, for example, if ra<<rb.

In addition, the display control unit 525 determines whether the user Ma watches the display surface of the transparent display 501 or watches the image Ia on the basis of the line of sight directions of the left eye and the right eye of the user Ma estimated by the line of sight estimation unit 521. If the lines of sight of the left eye and the right eye are directed to almost the same position (display position of superposition information) of the display surface of the transparent display 501, the display control unit 525 determines that the user Ma watches the display surface of the transparent display 501. On the other hand, if the lines of sight of the left eye and the right eye are directed to almost the same position of the image Ia, the display control unit 525 determines that the user Ma watches the image Ia.

In addition, when it is determined that there is focal point mismatch, and it is determined that the user Ma watches the display surface of the transparent display 501, the display control unit 525 displays a captured image obtained by the rear camera 502 on the transparent display 501, and displays superposition information (letters, images, or the like) so as to be superimposed on the captured image. Further, if it is determined that there is focal point mismatch, and it is determined that the user Ma watches the image Ia, the display control unit 525 does not display superposition information on the transparent display 501, displays superposition information so as to be inconspicuous by decreasing contrast of the superposition information or the like. In addition, if it is determined that there is no focal point mismatch, the display control unit 525 displays only superposition information on the transparent display 501.

A brief description will be made of an operation of the display apparatus 500 shown in FIG. 20. A captured image obtained by the front camera 503 is supplied to the line of sight estimation unit 521. The line of sight estimation unit 521 estimates line of sight directions of the left eye and the right eye of the user Ma on the basis of the captured image. The line of sight estimation result is supplied to the display control unit 525.

In addition, the captured image obtained by the front camera 503 is supplied to the distance estimation unit 522. The distance estimation unit 522 estimates the distance ra between the eye of the user Ma and the display surface of the transparent display 501 on the basis of the captured image. Further, a captured image obtained by the rear camera 502 is supplied to the distance estimation unit 523. The distance estimation unit 523 estimates the distance rb between the display surface of the transparent display 501 and the image Ia observed by the user Ma through the transparent display 501 on the basis of the captured image.

The superposition information generation unit 524 generates superposition information (letters, images, or the like) displayed on the transparent display 501. The display control unit 525 displays only the superposition information on the transparent display 501 when not in a focal point mismatch improving mode. In addition, the display control unit 525 performs the following control in the focal point mismatch improving mode.

That is to say, it is determined whether or not focal point mismatch for the display surface of the transparent display 501 and the image Ia occurs on the basis of the distance estimation results from the distance estimation units 522 and 523. In addition, it is determined whether the user Ma watches the display surface of the transparent display 501 or watches the image Ia on the basis of the line of sight directions of the left eye and the right eye of the user Ma estimated by the line of sight estimation unit 521.

In addition, when it is determined that there is focal point mismatch, and it is determined that the user Ma watches the display surface of the transparent display 501, the display control unit 525 displays a captured image obtained by the rear camera 502 on the transparent display 501, and displays superposition information (letters, images, or the like) so as to be superimposed on the captured image (refer to FIGS. 19(a) and (b)).

Further, if it is determined that there is focal point mismatch, and it is determined that the user Ma watches the image Ia, the display control unit 525 does not display superposition information on the transparent display 501, displays superposition information so as to be inconspicuous by decreasing contrast of the superposition information, or the like (refer to FIGS. 19(c) and (d)). In addition, if it is determined that there is no focal point mismatch, the display control unit 525 displays only superposition information on the transparent display 501 in the same manner as when not in the focal point mismatch improving mode described above.

A flowchart of FIG. 21 shows an example of the process procedures in a focal point mismatch improving mode of the display apparatus 500 shown in FIGS. 13 and 15. The display apparatus 500 starts the process in step ST41, and, then, proceeds to process in step ST42. In step ST42, the display apparatus 500 starts imaging by the rear camera 502 and the front camera 503.

Next, in step ST43, the display apparatus 500 estimates the distance ra between the eye of the user Ma and the display surface of the transparent display 501 on the basis of an image captured by the front camera 503. Next, in step ST44, the display apparatus 500 estimates the distance rb between the display surface of the transparent display 501 and the image Ia observed by the user Ma through the display surface of the transparent display 501. In addition, in step ST45, the display apparatus 500 compares the distance ra with the distance rb.

Next, in step ST46, the display apparatus 500 determines whether or not focal point mismatch for the display surface of the transparent display 501 and the image Ia occurs on the basis of the comparison result. If it is determined that the focal point mismatch occurs, the display apparatus 500 estimates line of sight directions of the left eye and the right eye of the user Ma on the basis of the image captured by the front camera 503 in step ST47.

Next, the display apparatus 500 determines whether or not the user Ma watches the display surface of the transparent display 501 on the basis of the estimation result of the line of sight directions in step ST48. If it is determined that the display surface of the transparent display 501 is watched, in step ST49, the display apparatus 500 displays the image captured by the rear camera 502 and the superposition information generated by the superposition information generation unit 524 on the transparent display 501 (refer to FIGS. 19(a) and (b)).

In addition, if it is determined that the display surface of the transparent display 501 is not watched in step ST48, the display apparatus 500 displays nothing on the transparent display 501, or displays superposition information generated by the superposition information generation unit 524 on the transparent display 501 so as to be inconspicuous by decreasing contrast thereof or the like (refer to FIGS. 19(c) and (d)) in step ST50. Further, if it is determined that focal point mismatch does not occur in step ST46, the display apparatus 500 displays only the superposition information generated by the superposition information generation unit 524 on the transparent display 501 in a normal state in step ST51.

After the processes in steps ST49, ST50 and ST51 are performed, the display apparatus 500 determines whether or not the focal point mismatch improving mode finishes in step ST52. Whether or not the focal point mismatch improving mode finishes is determined based on, for example, an explicit instruction operation of the user, although a user operation unit is not shown in FIG. 20. If it is determined that the mode does not finish, the display apparatus 500 returns to the process in step ST43 and repeatedly performs the above-described processes. On the other hand, if it is determined that the mode finishes, the display apparatus 500 ends the process in step ST53.

As described above, in the display apparatus 500 shown in FIG. 17, in a focal point mismatch improving mode, if it is determined that focal point mismatch occurs, a display state of the transparent display 501 is changed depending on whether or not the user Ma watches the display surface of the transparent display 501. That is to say, when the user Ma watches the display surface of the transparent display 501, an image captured by the rear camera 502 and superposition information generated by the superposition information generation unit 524 are displayed on the transparent display 501.

On the other hand, if it is determined that the display surface of the transparent display 501 is not watched, that is, the image Ia on the front side is observed through the transparent display 501, nothing is displayed on the transparent display 501, or superposition information generated by the superposition information generation unit 524 is displayed so as to be inconspicuous. For this reason, it is possible to improve discomfort of the user Ma due to focal point mismatch.

In addition, in the display apparatus 500 shown in FIG. 20 described above, the distance rb is estimated from an image captured by the rear camera 502, distance ra is estimated from an image captured by the front camera 503, and, whether or not focal point mismatch occurs is automatically determined through comparison of the distances in the display control unit 525. However, information regarding whether or not focal point mismatch occurs may be given, for example, through a user's manual operation. In this case, in the display apparatus 500 shown in FIG. 20, the distance estimation units 522 and 523 are not necessary. In addition, it is not necessary for the display control unit 525 to determine whether or not focal point mismatch occurs from distance information.

6. Sixth Embodiment

"Configuration Example of Display Apparatus"

FIG. 22 schematically shows an exterior of a display apparatus 600 according to the sixth embodiment. The display apparatus 600 configures a mobile apparatus. The display apparatus 600 includes a transparent display 601. On the upper end of the transparent display 601, a rear camera (rear image sensor) 602 and a front camera (front image sensor) 603 are disposed so as to be adjacent to each other. The rear camera 602 captures an image on the front side of the transparent display 601. The front camera 603 captures an image on the rear side of the transparent display 601. In addition, a light control unit 604 constituted by a liquid crystal lens or a parallax barrier is attached to the rear side of the transparent display 601.

FIG. 23 shows an example of state where a user Ma located on the rear side of the transparent display 601 observes an image Ia through the transparent display 601. This examples shows a state where the distance rb between a display surface of the transparent display 601 and the image Ia is much larger (ra<<rb) than the distance ra between the eye of the user Ma and the display surface of the transparent display 601. In this case, since parallax of the display surface of the transparent display 601 and the image Ia is large, left and right images are not united with each other, and thus viewing is difficult.

In this case, in a view observed when the user Ma watches the display surface of the transparent display 601, the image Ia is in a state of not being united. In addition, in this case, in a view observed when the user Ma watches the image Ia, the display surface of the transparent display 601 is in a state of not being united.

In the display apparatus 600, as shown in FIG. 24(a), superposition information (letters in the shown example) such as letters or images displayed on the display surface of the transparent display 601 can be perceived at almost the same position as the image Ia by the user Ma as shown in FIG. 24(b). For this reason, left eye superposition information and the right eye superposition information are generated as superposition information, and the two pieces of superposition information are given appropriate parallax and are displayed on the transparent display 601.

FIG. 25 shows a circuit configuration example of the display apparatus 600 according to the sixth embodiment. The display apparatus 600 includes the transparent display 601, the rear camera 602, the front camera 603, and the light control unit 604. In addition, the display apparatus 600 includes a depth map acquisition unit 621, a superposition position determination unit 622, a user viewpoint position determination unit 624, a user viewpoint image generation unit 624, a superposition information generation unit 625, and a display control unit 626.

The depth map acquisition unit 621 acquires a depth map by detecting a depth for each pixel on the basis of a captured image obtained by the rear camera 602. As methods of detecting a depth, there are a calculation method from stereo inputs, prediction using 2D/3D conversion, a combination of a single lens camera and a distance sensor, and the like. The superposition position determination unit 622 refers to the depth map and determines display positions for the left eye and the right eye of superposition information displayed on the display surface of the transparent display 601. In this case, the superposition position determination unit 622 determines display positions for the left eye and the right eye such that a user can perceive superposition information at almost the same position as that of the image Ia on the front side observed through the transparent display 601.

The user viewpoint position detection unit 623 detects viewpoint positions (positions of the eyes) of the left eye and the right eye of the user on the basis of a captured image obtained by the front camera 603. The detection of viewpoint positions may employ a technique disclosed in ""Passive Driver Gaze Tracking with Active Appearance Models" T. Ishikawa, S. Baker, I. Matthews, and T. Kanade Proceedings of the 11th World Congress on Intelligent Transportation Systems, October, 2004", or the like.

The user viewpoint image generation unit 624 refers to the detected viewpoint positions of the left eye and the right eye of the user and the acquired depth map and generates each viewpoint image of the left eye and the right eye from a captured image obtained by the rear camera 602. A technique in which a depth of an image is obtained and any viewpoint image is generated therefrom is disclosed in, for example, Japanese Unexamined Patent Application Publication No. 2011-176822. The superposition information generation unit 625 generates superposition information such as letters or images displayed on the transparent display 501.

The display control unit 626 displays superposition information generated by the superposition information generation unit 625 on the transparent display 601 as it is when not in a display position adjusting mode. In this case, a single piece of superposition information common to the left eye and the right eye is displayed on the transparent display 601, and the user perceives the superposition information in the display surface of the transparent display 601. On the other hand, the display control unit 626 performs the following display in superposition information regions shown at display positions for the left eye and the right eye, determined by the superposition position determination unit 622, in the display position adjusting mode.

In this case, the display control unit 626 displays superposition information in a superposition information region of the left eye, and controls the light control unit 604 such that the left eye is irradiated with the display information. In addition, the display control unit 626 cuts the region portion from the viewpoint image of the right eye so as to be displayed in the superposition information region of the left eye, and controls the light control unit 604 such that the right eye is irradiated with the display information.

Further, the display control unit 626 displays superposition information in a superposition information region of the right eye, and controls the light control unit 604 such that the left eye is irradiated with the display information. In addition, the display control unit 626 cuts the region portion from the viewpoint image of the left eye so as to be displayed in the superposition information region of the right eye, and controls the light control unit 604 such that the left eye is irradiated with the display information. The light control unit 604 may be constituted by a liquid crystal array lens, for example, as disclosed in Japanese Unexamined Patent Application Publication No. 2004-258631. FIG. 26 is a diagram illustrating a relationship between the above-described superposition information regions of the left eye and the right eye, that is, light control display portions, and superposition information displayed therein or irradiation of the respective viewpoint images to the left eye and the right eye.

A brief description will be made of an operation of the display apparatus 600 shown in FIG. 25. A captured image obtained by the rear camera 602 capturing an image on the front side of the transparent display 601 is supplied to the depth map acquisition unit 621. The depth map acquisition unit 621 detects a depth for each pixel on the basis of the captured image obtained by the rear camera 602 so as to acquire a depth map. The depth map is supplied to the superposition position determination unit 622. The superposition position determination unit 622 determines display positions for the left eye and the right eye such that a user can perceive superposition information at almost the same position as that of the image Ia on the front side observed through the transparent display 601. The display position information is supplied to the display control unit 626.

In addition, a captured image obtained by the front camera 603 capturing an image on the rear side of the transparent display 601 is supplied to the user viewpoint position detection unit 623. The user viewpoint position detection unit 623 detects viewpoint positions (positions of the eyes) of the left eye and the right eye of the user on the basis of the captured image obtained by the front camera 603. The viewpoint position information is supplied to the display control unit 626.

The display control unit 626 displays superposition information generated by the superposition information generation unit 625 on the transparent display 601 as it is when not in a display position adjusting mode. In this case, the user perceives the superposition information in the display surface of the transparent display 601. In addition, the display control unit 626 performs the following display in superposition information regions shown at display positions for the left eye and the right eye, determined by the superposition position determination unit 622, of the display surface of the transparent display 601, in the display position adjusting mode.

In this case, the display control unit 626 displays superposition information in a superposition information region of the left eye, and controls the light control unit 604 such that the left eye is irradiated with the display information. In addition, the display control unit 626 cuts the region portion from the viewpoint image of the right eye so as to be displayed in the superposition information region of the left eye, and controls the light control unit 604 such that the right eye is irradiated with the display information.

Further, the display control unit 626 displays superposition information in a superposition information region of the right eye, and controls the light control unit 604 such that the right eye is irradiated with the display information. In addition, the display control unit 626 cuts the region portion from the viewpoint image of the left eye so as to be displayed in the superposition information region of the right eye, and controls the light control unit 604 such that the left eye is irradiated with the display information. In this case, the user perceives the superposition information at almost the same position as that of the image Ia on the front side observed through the transparent display 601.

A flowchart of FIG. 27 shows an example of the process procedures in a display position adjusting mode of the display apparatus 600 shown in FIGS. 22 and 25. The display apparatus 600 starts the process in step ST61, and, then, proceeds to a process in step ST62. In step ST62, the display apparatus 600 starts imaging by the rear camera 602 and the front camera 603. Further, in step ST63, a depth for each pixel of a target subject (image Ia) observed by the user through the transparent display 601 is detected from an image captured by the rear camera 602, so as to generate a depth map.

Next, in step ST64, the display apparatus 600 detects viewpoint positions of the left eye and the right eye of the user from an image captured by the front camera 603. In addition, in step ST65, the display apparatus 600 detects superposition positions for the left eye and the right eye of superposition information in the display surface of the transparent display 601. Further, in step ST66, the display apparatus 600 generates viewpoint images of the left eye and the right eye of the user from the image captured by the rear camera 602 by referring to the viewpoint positions of the left eye and the right eye of the user and the depth map.

Next, in step ST67, the display apparatus 600 displays the superposition information and the viewpoint images only in image superposition regions shown at the superposition positions of the left eye and the right eye, and performs light control. Thereby, the user can perceive the superposition information at almost the same position as that of the image Ia on the front side observed through the transparent display 601.

Next, the display apparatus 600 determines whether or not the display position adjusting mode finishes in step ST68. Whether or not the display position adjusting mode finishes is determined based on, for example, an explicit instruction operation of the user, although a user operation unit is not shown in FIG. 25. If it is determined that the mode does not finish, the display apparatus 600 returns to the process in step ST63 and repeatedly performs the above-described processes. On the other hand, if it is determined that the mode finishes, the display apparatus 600 ends the process in step ST69.

As described above, in the display apparatus 600 shown in FIG. 22, in a display position adjusting mode, superposition information for the left eye and the right eye to which parallax is applied is displayed on the transparent display 601, light control is performed, and thereby the user can perceive the superposition information at almost the same position as that of the image Ia on the front side observed through the transparent display 601. For this reason, it is possible to achieve a seamless combination of the image Ia and the superposition information and to thereby alleviate discomfort of the user due to occurrence of focal point mismatch.

7. Modified Examples

In addition, in the above description, a case where the present technology is applied to a mobile apparatus has been shown. However, the present technology may be applied to other apparatuses, building structures, and the like.

For example, a show window may have the same structure as the above-described display apparatus 400 according to the fourth embodiment. In this case, the inside of the show window is usually observed through the transparent display. In a case where a worker enters the show window and exchanges display items or the like, the internal transparent display is opaque, and camera images, television images, or reproduced images are displayed on the external transparent display.

In addition, for example, a part of the wall of a house may have the same structure as the above-described display apparatus 400 according to the fourth embodiment. In this case, an ambient property is usually improved by being see-through, and when a person is detected, the external transparent display is opaque, and camera images, television images, or reproduced images are displayed on the internal transparent display.

In addition, in the first embodiment (refer to FIG. 1), the second embodiment (refer to FIG. 5), the third embodiment (refer to FIG. 9), the fifth embodiment (refer to FIG. 17), and the sixth embodiment (refer to FIG. 22), a configuration in which two cameras, the rear camera (image sensors) 502 and the front camera 503, are provided has been shown. However, instead of disposing the two cameras, for example, a single camera (image sensor) may be disposed, and images on the front side and the rear side of the transparent display may be captured by the single camera, as disclosed in, for example, Japanese Patent No. 4000449.

Further, the present technology may have the following configurations.

According to one embodiment, an apparatus includes
a display controller configured to control a display state of a transparent display based on a sensor output that contains information regarding an object separated from the apparatus.
According to one aspect,
the information includes image information.

According to another aspect,
the information includes information regarding a foreign substance region.
According to another aspect,
at least a part of a human hand is a foreign substance that blocks the foreign substance region of an image displayed on the transparent display.
According to another aspect, the embodiment further includes
an interpolated image capture creation unit that generates and substitutes an interpolated image portion of a scene blocked by the at least a part of the human hand.
According to another aspect, the apparatus further includes
a region estimation unit that identifies a region of a scene that is blocked by an object; and
an interpolated image creation unit that generates and substitutes an interpolated image portion of the region of the scene that is blocked by the object.
According to another aspect,
the interpolated image creation unit identifies the region of the scene that is blocked by the object by observing a movement of the object between one frame and a past frame.
According to another aspect,
the interpolated image creation unit identifies the region of the scene that is blocked by the object by observing peripheral pixels of the object.
According to another aspect, the apparatus further includes
a superposition information generation unit that generates superposition information for display on the transparent display;
a superposition information processing unit that selectably sets a color of the superposition information in relation to a color of a region in an image along a line of sight direction of a person that is not a user of the apparatus.
According to another aspect,
the superposition information processing unit sets the color of the superposition information to be a same color as the region in the image along the line of sight of a person who is not the user when the apparatus is in a privacy protection mode.
According to another aspect,
the superposition information processing unit sets the color of the superposition information to be a different color than the region in the image along the line of sight of a person who is not the user when the apparatus is not in the privacy protection mode.
According to another aspect, the apparatus further includes
the transparent display, the transparent display having an internal display that is visible to a user, and an external display that faces an opposite direction as the internal display, wherein
the display controller is configured to change the external display from a transparent state to an opaque state in response to activation of a privacy protection mode.
According to another aspect,
the privacy protection mode is activated in response to a person being detected who has a line of sight directed toward the external display.
According to another aspect, the apparatus further includes
a person detection unit that detects the person; and a line of sight estimation unit that estimates the line of sight of the person.

According to another aspect, the apparatus further includes a superposition information generation unit that generates superposition information for display on the transparent display, wherein the display controller determines whether there is a focal point mismatch of a user between a surface of the transparent display and an image, and when no mismatch exists the display controller causes the superposition information to be displayed on the transparent display.

According to another aspect, the display controller causes the superposition information to be displayed inconspicuously on the transparent display when there is a focal point mismatch and the surface of the surface of the transparent display is not being watched, and the display controller displays the image with the superposition information on the transparent display when there is a focal point mismatch and the surface of the surface of the transparent display is being watched.

According to another aspect, the apparatus further includes a superposition information generation unit that generates superposition information for display on the transparent display; and a superposition determination unit that determines display positions for a left eye and a right eye of a user; wherein the display controller displays the superposition information at a substantially same perceived depth as an image displayed on the transparent display.

According to another aspect, the apparatus further includes a single image sensor that provides images for a front side of the transparent display and a rear side of the transparent display.

According to a method embodiment, a method of controlling a transparent display includes receiving a sensor output that contains information regarding an object separated from the transparent display; and controlling with processing circuitry a display state of the transparent display based on the sensor output.

According to a non-transitory computer readable storage medium embodiment, the medium includes computer readable instructions stored therein that when executed by a processor perform a method of controlling a transparent display, the method includes receiving a sensor output that contains information regarding an object separated from the transparent display; and controlling with processing circuitry a display state of the transparent display based on the sensor output.

According to one embodiment, a display apparatus includes a transparent display; a sensor unit that obtains information on the periphery of the transparent display; and a control unit that controls a display state of the transparent display on the basis of an output of the sensor unit.

According to one aspect, the sensor unit obtains a captured image by capturing an image of the periphery of the transparent display, and wherein the control unit controls a display state of the transparent display by performing an image process using the captured peripheral image of the transparent display.

According to another aspect, the sensor unit includes a rear image sensor that captures an image on a front side of the transparent display and a front image sensor that captures an image on a rear side of the transparent display.

According to another aspect, the sensor unit includes a single image sensor that can capture images on a front side and a rear side of the transparent display.

According to another aspect, the sensor unit includes a rear image sensor that captures an image on a front side of the transparent display, and wherein the control unit displays an image based on an image of a portion corresponding to a region of a foreign substance of a captured image obtained by the rear image sensor only in the region of the foreign substance included in an image observed by a user through the transparent display, and deletes the foreign substance from the image observed by the user through the transparent display.

According to another aspect, the sensor unit further includes a touch panel that is disposed on a surface of the front side of the transparent display, and wherein the control unit detects a region of the hand of the user from an output of the touch panel as the region of the foreign substance, displays an image of a portion corresponding to the region of the hand of the user of a captured image obtained by the rear image sensor only in the region of the hand of the user, and deletes the hand of the user from an image observed by the user through the transparent display.

According to another aspect, the embodiment further includes an object designation unit that designates a predetermined object from an image observed by the user through the transparent display, wherein the control unit sets an object region including the designated predetermined object as the region of the foreign substance, displays an image based on an image of a portion corresponding to the object region of a captured image obtained by the rear image sensor only in the object region, and deletes the predetermined object from an image observed by the user through the transparent display.

According to another aspect, when the designated object moves, the control unit displays an image of a portion corresponding to the object region of a captured image of a past frame, obtained by the rear image sensor, in which the predetermined object does not exist, only in the object region, and deletes the predetermined object from an image observed by the user through the transparent display.

According to another aspect, the object designation unit includes a touch panel that is disposed on the rear side of the transparent display.

According to another aspect, the sensor unit includes a rear image sensor that captures an image on a front side of the transparent display and a front image sensor that captures an image on a rear side of the transparent display, wherein the display apparatus further includes a superimposition information generation unit that generates superimposition information displayed on the transparent display, wherein the control unit displays the generated superimposition information on the transparent display, and, wherein, when a line of sight to the superimposition information displayed on the transparent display is detected using a captured image obtained by the rear image sensor, the control unit acquires color information on a region in the line of sight direction observed through the transparent display from a captured image obtained by the front image sensor, and sets a display color of superimposition information displayed on the transparent display to a color corresponding to the acquired color information.

According to another aspect, the transparent display includes a first transparent display on a front side thereof and a second transparent display on a rear side thereof, wherein the sensor unit includes a person detection sensor that detects a person on the front side of the transparent display and a rear image sensor that captures an image on the front side of the transparent display, and wherein the control unit sets the first transparent display to an opaque state and displays a captured image obtained by the rear image sensor on the second transparent display when existence of a person is detected by the person detection sensor.

According to another aspect, the control unit determines whether or not there is a line of sight to the transparent display on the basis of a captured image obtained by the rear image sensor, and wherein the control unit sets the first transparent display to an opaque state and displays a captured image obtained by the rear image sensor on the second transparent display when the presence of the person is detected by the person detection sensor and there is the line of sight to the transparent display.

According to another aspect, when the line of sight to the transparent display is a line of sight to a predetermined divided region of the transparent display, the control unit sets the predetermined divided region of the first transparent display to an opaque state and displays an image of a portion corresponding to the predetermined divided region of a captured image obtained by the rear image sensor in the predetermined divided region of the second transparent display.

According to another aspect, the sensor unit includes a person detection sensor that detects a person on the front side of the transparent display and a rear image sensor that captures an image on the front side of the transparent display, wherein the display apparatus further includes a superimposition information generation unit that generates superimposition information displayed on the transparent display, and wherein the control unit determines whether or not a user watches a display surface of the transparent display on the basis of a captured image obtained by the front image sensor when focal point mismatch in the user for the display surface of the transparent display and an image observed through the transparent display occurs, and, displays a captured image obtained by the rear image sensor on the transparent display and displays the generated superimposition information so as to be superimposed on the captured image when it is determined that the display surface of the transparent display is watched.

According to another aspect, the control unit does not display the generated superimposition information on the transparent display, or displays the superimposition information on the transparent display so as to be inconspicuous.

According to another aspect, the control unit determines focal point mismatch in the user for the display surface of the transparent display and an image observed through the transparent display on the basis of a distance between the eye of the user and the display surface of the transparent display, estimated from a captured image obtained by the front image sensor, and a distance between the display surface of the transparent display and the image observed through the transparent display, estimated from a captured image obtained by the rear image sensor.

According to another aspect, the embodiment further includes superimposition information generation unit that generates superimposition information displayed on the transparent display; and a light control unit that is disposed on a surface of a rear side of the transparent display, wherein the sensor unit includes a rear image sensor that captures an image on a front side of the transparent display and a front image sensor that captures an image on a rear side of the transparent display, wherein the control unit generates left eye superimposition information and the right eye superimposition information to which parallax for enabling the superimposition information to be perceived by a user at a position of an image observed through the transparent display is applied, so as to be displayed on the transparent display, on the basis of positions of the left and right eyes of the user relative to the transparent display, acquired from a captured image obtained by the front image sensor, and depth information of an image observed through the transparent display, acquired from a captured image obtained by the rear image sensor, and wherein the control unit controls the light control unit such that light from the left eye superimposition information displayed on the transparent display arrives at the left eye of the user and light from the right eye superimposition information displayed on the transparent display arrives at the right eye of the user.

According to a method embodiment, a method of controlling a display includes detecting a peripheral environment of the transparent display; and controlling a display state of the transparent display on the basis of the peripheral environment.

REFERENCE SIGNS LIST 100, 200, 300, 400, 500, 600 DISPLAY APPARATUS
101, 201, 301, 401, 501, 601 TRANSPARENT DISPLAY
102, 202, 302, 402, 502, 602 REAR CAMERA
103, 203, 303, 503, 603 FRONT CAMERA
104, 204 TOUCH PANEL
121, 221 VIEWPOINT ESTIMATION UNIT
122, 222 REGION ESTIMATION UNIT
123, 223 CAPTURED IMAGE STORAGE UNIT
124, 224 INTERPOLATED IMAGE CREATION UNIT
125, 225, 325, 424, 525, 626 DISPLAY CONTROL UNIT
126, 226, 323, 423, 524, 625 SUPERPOSITION INFORMATION GENERATION UNIT
321, 421, 521 LINE OF SIGHT ESTIMATION UNIT
322 COLOR INFORMATION ACQUISITION UNIT
324 SUPERPOSITION INFORMATION PROCESSING UNIT

401R FRONT SIDE DISPLAY
401F REAR SIDE DISPLAY
403 PERSON DETECTION SENSOR
422 PERSON DETECTION UNIT
522, 523 DISTANCE ESTIMATION UNIT
604 LIGHT CONTROL UNIT
621 DEPTH MAP ACQUISITION UNIT
622 SUPERPOSITION POSITION DETERMINATION UNIT
623 USER VIEWPOINT POSITION DETECTION UNIT
624 USER VIEWPOINT IMAGE GENERATION UNIT

The invention claimed is:

1. An apparatus, comprising:
a transparent display; and
circuitry configured to:
control a first display state of the transparent display based on a sensor output, wherein the sensor output includes first information associated with an object that is on a first side of the transparent display;
generate superposition information that corresponds to the object;
determine a focal point mismatch of a first user, between the transparent display and a first image of a region visible to the first user through the transparent display,
wherein the first user is on a second side of the transparent display opposite to the first side;
display the superposition information on the transparent display based on the determined focal point mismatch.

2. The apparatus of claim 1, wherein the first information further comprises image information.

3. The apparatus of claim 1, wherein the circuitry is further configured to:
detect a human hand on the first side of the transparent display; and
generate an interpolated image portion of a foreign substance region based on the first image, wherein the foreign substance region corresponds to the human hand on the first side of the transparent display.

4. The apparatus of claim 3, wherein the circuitry is further configured to determine the foreign substance region based on a viewpoint of the first user.

5. The apparatus of claim 4, wherein the touch panel is further configured to:
detect at least a part of the human hand on the transparent display,
wherein the at least part of the human hand corresponds to the foreign substance region of the first image.

6. The apparatus of claim 1, wherein the circuitry is further configured to:
identify a first portion of the first image blocked by the object, wherein the first portion corresponds to a foreign substance region on the transparent display;
generate an interpolated image of the foreign substance region based on the first image; and
control the transparent display to display the interpolated image on the foreign substance region of the transparent display.

7. The apparatus of claim 6, wherein the circuitry is further configured to identify the first portion of the first image that is blocked by the object, based on a movement of the object between a first frame and a second frame previous to the first frame.

8. The apparatus of claim 6, wherein the circuitry is further configured to identify the first portion of the first image that is blocked by the object, based on peripheral pixels of the object.

9. The apparatus of claim 1, wherein the circuitry is further configured to first color information of the superposition information based on second color information of the first image.

10. The apparatus of claim 9, wherein the circuitry is further configured to set the first color information same as the second color information, based on an operation mode of the apparatus that is different from a privacy protection mode.

11. The apparatus of claim 9, wherein the circuitry is further configured to set the first color information of the superposition information to be different from the second color information of the first image, based on an operation mode of the apparatus that is different from a privacy protection mode.

12. The apparatus of claim 1, wherein the transparent display comprises:
an internal display on the second side of the transparent display, that is visible to the first user; and
an external display on the first side of the transparent display,
wherein the circuitry is further configured to change a second display state of the external display from a transparent state to an opaque state, based on activation of a privacy protection mode.

13. The apparatus of claim 12, wherein the circuitry is further configured to activate the privacy protection mode based on detection of a second user on the first side of the transparent display such that a line of sight of the second user is directed towards the external display.

14. The apparatus of claim 13, wherein the circuitry is further configured to:
detect the second user on the first side of the transparent display; and
estimate the line of sight of the second user.

15. The apparatus of claim 1, wherein the circuitry is further configured to:
display the superposition information inconspicuously on the transparent display based on the focal point mismatch and a second side of the transparent display that is unwatched by the first user;
generate a second image based on the superposition information superimposed on the first image; and
display the second image on the transparent display based on the focal point mismatch and the second side of the transparent display that is watched by the first user.

16. The apparatus of claim 1, wherein the circuitry is further configured to:
determine a left display position on the transparent display for a left eye of the first user and a right display position on the transparent display for a right eye of the first user; and
display the superposition information between the left display position and the right display position on the transparent display.

17. The apparatus of claim 1, further comprising an image sensor configured to generate a plurality of images from the first side of the transparent display and the second side of the transparent display.

18. The apparatus of claim 1, further comprising a touch panel on the transparent display, wherein the touch panel is configured to receive, from the first user, an input that corresponds to selection of the object from the first image.

19. A method, comprising:

in an apparatus that comprises a transparent display;

receiving a sensor output signal that includes first information associated with an object that is on a first side of the transparent display;

generating superposition information that corresponds to the object;

determining a focal point mismatch of a user, between the transparent display and an image of a region visible to the user through the transparent display, wherein the user is on a second side of the transparent display opposite to the first side:

displaying the superposition information on the transparent display based on the determined focal point mismatch; and controlling, a display state of the transparent display based on the sensor output signal.

20. A non-transitory computer-readable medium having stored thereon computer-executable instructions for causing a computer to execute operations, the operations comprising:

receiving a sensor output signal that includes first information associated with an object that is on a first side of a transparent display;

generating superposition information that corresponds to the object;

determining a focal point mismatch of a user, between the transparent display and an image of a region visible to the user through the transparent display, wherein the user is on a second side of the transparent display opposite to the first side;

displaying the superposition information on the transparent display based on the determined focal point mismatch; and controlling, a display state of the transparent display based on the sensor output signal.

* * * * *